(12) United States Patent
Chan et al.

(10) Patent No.: US 8,805,368 B2
(45) Date of Patent: Aug. 12, 2014

(54) METHOD AND SYSTEM FOR LOAD-BALANCING ACROSS MULTIPLE ACCESS NETWORKS

(71) Applicant: Verizon Patent and Licensing Inc., Basking Ridge, NJ (US)

(72) Inventors: Yee Sin Chan, San Jose, CA (US); Jin Yang, Orinda, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/933,980

(22) Filed: Jul. 2, 2013

(65) Prior Publication Data

US 2013/0295940 A1 Nov. 7, 2013

Related U.S. Application Data

(62) Division of application No. 12/401,024, filed on Mar. 10, 2009, now Pat. No. 8,489,108.

(51) Int. Cl.
*H04W 4/00* (2009.01)

(52) U.S. Cl.
USPC ............... 455/435.3; 455/552.1; 455/453; 455/435.2; 455/436; 455/422.1; 370/321; 370/328

(58) Field of Classification Search
USPC .............. 455/550.1, 552.1, 553.1, 422.1, 455/450–455, 464, 509, 436–444, 455/435.1–435.3, 432.1–434; 370/321–337, 339, 341–348, 431–463
See application file for complete search history.

(56) References Cited

U.S. PATENT DOCUMENTS

| 5,678,184 | A  | * | 10/1997 | Cutler et al. .................. 455/436 |
| 7,072,663 | B2 | * | 7/2006  | Ramos et al. ................. 455/453 |
| 8,081,978 | B2 | * | 12/2011 | Pecen et al. ................ 455/435.2 |
| 8,121,607 | B2 | * | 2/2012  | Fang et al. .................... 455/453 |
| 2004/0116153 | A1 |  | 6/2004 | Kaminski et al. |
| 2004/0166857 | A1 | * | 8/2004 | Shim et al. .................... 455/436 |
| 2006/0019663 | A1 | * | 1/2006 | Cuffaro et al. ................ 455/436 |
| 2008/0058000 | A1 |  | 3/2008 | Tanaka et al. |
| 2008/0101292 | A1 |  | 5/2008 | Sengupta et al. |
| 2008/0254802 | A1 |  | 10/2008 | Ohta et al. |
| 2009/0005052 | A1 |  | 1/2009 | Abusch-Magder |
| 2009/0069018 | A1 | * | 3/2009 | Babbar ......................... 455/445 |
| 2009/0279504 | A1 | * | 11/2009 | Chin et al. .................... 370/331 |
| 2010/0075667 | A1 | * | 3/2010 | Nakamata et al. ......... 455/432.3 |
| 2010/0272060 | A1 | * | 10/2010 | Junela et al. ................. 370/331 |

FOREIGN PATENT DOCUMENTS

| CN | 1483294 | 3/2004 |
| CN | 1509112 | 6/2004 |
| CN | 1738479 | 2/2006 |

* cited by examiner

*Primary Examiner* — Ronald Eisner

(57) ABSTRACT

An approach is provided for interworking between radio access networks that utilize different radio access technologies. Loading information of a plurality of radio access networks that are accessible by a terminal is determined. A list of candidates from the radio access networks are output based on the loading information for use by the terminal.

15 Claims, 11 Drawing Sheets

METHOD AND SYSTEM FOR LOAD-BALANCING ACROSS MULTIPLE ACCESS NETWORKS

CROSS-REFERENCE TO RELATED APPLICATIONS

This application is a divisional of U.S. application Ser. No. 12/401,024, filed Mar. 10, 2009, the contents of which are incorporated herein by reference in their entireties.

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, as well as a host of other tasks. Additional enhancements, such as location-awareness features, e.g., global positioning system (GPS) tracking, also enable mobile device users to monitor their position and present their location via a local display.

To facilitate this increasing range of features and services, a variety radio access technologies (RAT) have emerged that are capable of supporting the growing quality of service (QoS) requirements associated with these features and services. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other RATs have also been developed by various professional bodies, such as the Institute of Electrical and Electronic Engineers (IEEE), for the support of various applications, services, and deployment scenarios. For example, the IEEE 802.11 standard, also known as wireless fidelity (WIFI™), has been introduced for wireless local area networking, while the IEEE 802.16 standard, also known as worldwide interoperability for microwave access (WIMAX™), has been introduced for the provision of wireless communications on point-to-point links, as well as for full mobile access over longer distances. Other examples include BLUETOOTH™, ultra-wideband (UWB), the IEEE 802.22 standard, etc.

Despite a similar goal to provide consumers with ubiquitous connectivity, RATs have traditionally been incompatible with one another. Namely, RAT incompatibilities have extended between differing standardization organizations, as well as occurred within like standardization organizations. For instance, RAT standards like UMTS, HRPD, and (WIMAX™), respectively developed by the 3GPP, the 3GPP2, and the IEEE organizations, are incompatible. Other RAT standards like GSM and UMTS, both developed by the 3GPP, are incompatible. Still further, some 3GPP2 standards, such as the CDMA2000 standard one times radio transmission technology (CDMA2000 1.times.RTT) and HRPD, are also incompatible. As such, trends in RAT migration and business mergers have resulted in service providers (or carriers) not only supporting various radio access networks (RAN), but also implementing more than one incompatible RAT on these RANs. Although multi-RAT (or multi-mode) devices have been developed to enable application services to be accessed using various RATs, these devices have not improved the utilization of or balance between network resources, such as the radio spectrum of a RAN infrastructure.

Therefore, there is a need for an approach that provides load-balancing across multiple access networks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for load-balancing across multiple access networks are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to various enumerated radio access technologies and application services, it is contemplated that various exemplary embodiments are also applicable to other suitable or equivalent access technologies and application services.

Figure 1:
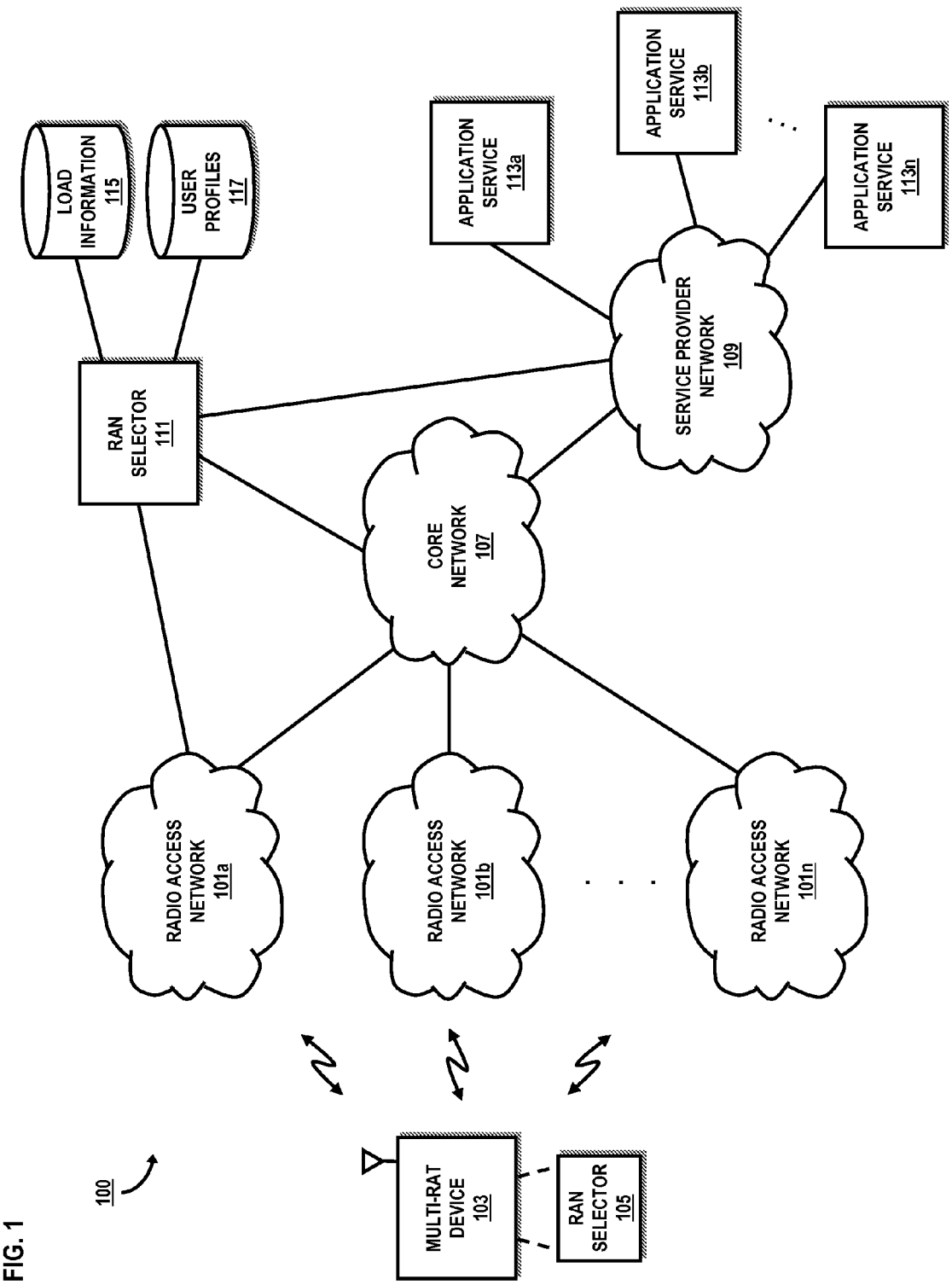
FIG. 1 is a diagram of a system capable of inter-technology load-balancing for multi-radio access technology networks, according to an exemplary embodiment.

FIG. 1 is a diagram of a system capable of inter-technology load-balancing for multi-radio access technology networks, according to an exemplary embodiment. For the purposes of illustration, system 100 is described with respect to a mechanism for determining a list of candidate radio access networks (RAN) based on loading information (e.g., network traffic conditions) corresponding to a plurality of RANs (e.g., RANs 101a, 101b,☐, 101n) accessible by a terminal, such as multi-radio access technology (RAT) device 103, as well as initiating (or otherwise performing) handover to a particular candidate RAN (i.e., a target RAN) based on one or more selection criteria or conditions, such as candidate RAN loading conditions (e.g., network traffic measurements, threshold values, etc.), spatial positioning of the terminal, handover interruption times for candidate RANs, quality of service (QoS) requirements, signal conditions (e.g., radio frequency signal strength, noise, etc.), requested application service, service policies corresponding to the terminal, preferences of a service provider of system 100, threshold values, application service initialization times, and/or the like. In exemplary embodiments, the mechanism may reside locally within respective terminals, such as RAN selector 105 of device 103, or alternatively (or additionally), may reside remotely over one or more networks (e.g., RANs 101a-101n, core network 107, service provider network 109, the Internet (not shown), etc.), such as RAN selector 111. It is noted that RAN selector 111 can be maintained and operated by a service provider of system 100. In this manner, inter-technology load-balancing for multi-RAT networks may be network-coordinated and/or coordinated by respective terminals, e.g., respective multi-RAT devices 103. While specific reference will be made hereto, it is contemplated that system 100 may embody many forms and include multiple and/or alternative components and facilities.

Figure 2:
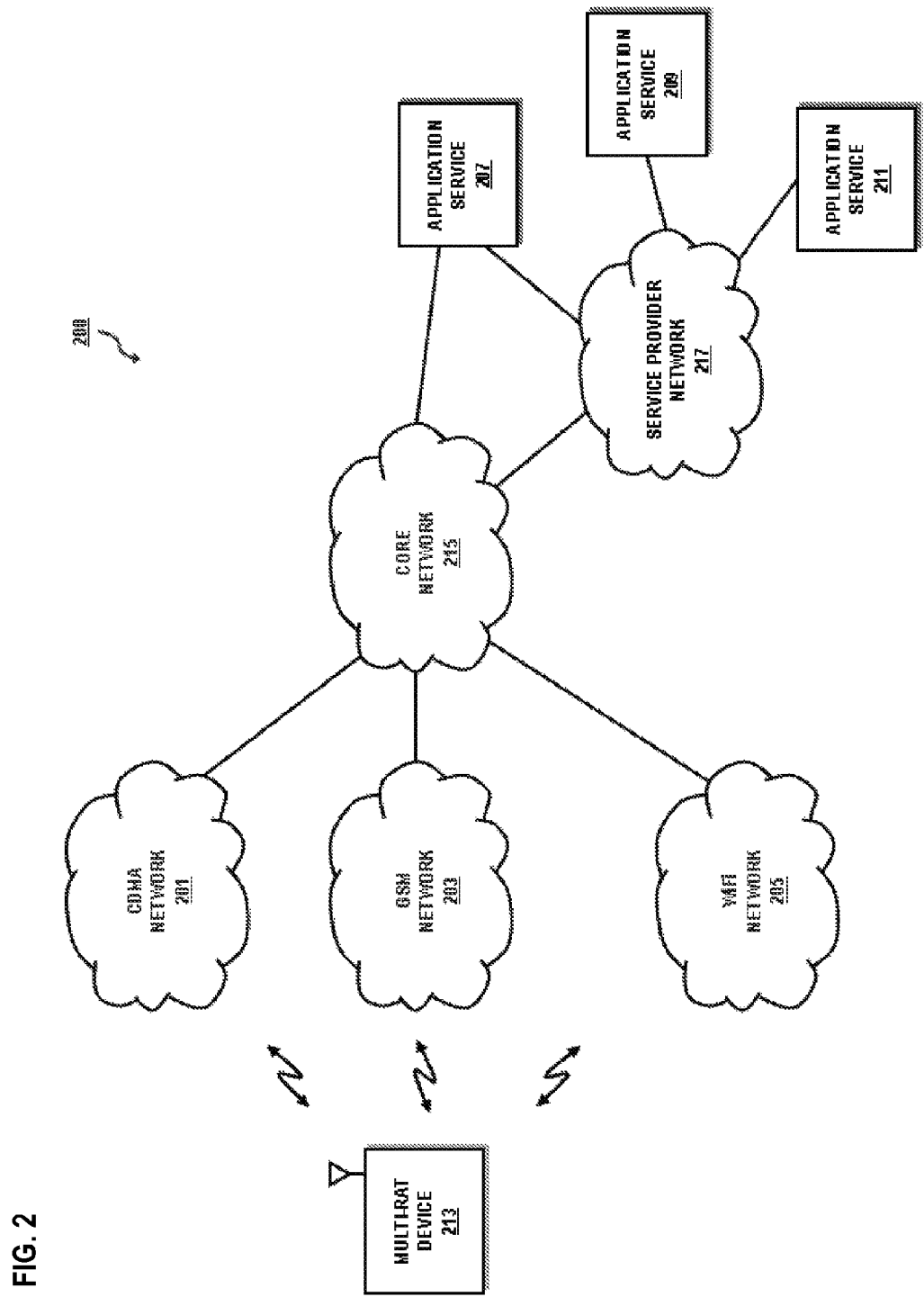
FIG. 2 is an exemplary diagram of a conventional system incorporating a plurality of radio access networks implementing plurality radio access technologies.

As previously mentioned, service providers are increasingly supporting multi-RAT infrastructures, but do not consider load balancing. For instance, FIG. 2 is an exemplary diagram of a conventional system 200 incorporating a plurality of RANs implementing particular RATs, such as CDMA network 201, GSM network 203, and (WIFI™) network 205. In this manner, a service provider of system 200 can make a plurality of application services (e.g., application services 207, 209, and 211) available to users (or subscribers) at multi-RAT devices, such as multi-RAT device 213, over RANs 201-205, core network 215 and service provider network 217. It is noted that a single-RAT device (not shown) would only be able to access a particular RAN (e.g., RAN 201) of a same RAT (e.g., CDMA) and, thereby, would be unable to access the other RANs (e.g., RANs 203 and 205) of differing RATs (e.g., GSM and (WIFI™)) even though these other RANs are operated and maintained by the service provider of system 200. Meanwhile, by supporting multi-RAT devices (e.g., multi-RAT device 213), the service provider can improve user accessibility to application services 207-211 via various RATs (e.g., CDMA, GSM, and (WIFI™)), as well as increase user mobility and roaming capability. Unfortunately, conventional multi-RAT devices and/or multi-RAT systems do not effectuate efficient access to application services 207-211. Namely, the utilization of and balance between the resources (e.g., available bandwidth, radio spectrum, etc.) of RANs 201-205 will inevitably become suboptimal. Namely, there is no mechanism to optimize the choice between available RATs. As such, some RATs may become congested, while other RATs may be underutilized. These inefficiencies are unacceptable, especially in light of the highly competitive nature of the telecommunications industry characterized by carriers relying, more than ever, on network availability and QoS as key differentiators in delivering voice, data, and video services.

Therefore, the approach according to certain embodiments of system 100 stem from the recognition that the ability to effectuate inter-technology load-balancing for multi-RAT RANs, provides an effective technique to diversify infrastructures through mutli-RATs, manage (or otherwise optimize) the utilization of and balance between network resources (e.g., available bandwidth, radio spectrum, etc.), increase spectral efficiency, reduce the probability of application services being blocked, provide guaranteed QoS, and increase revenues, as well as improve user satisfaction.

According to various embodiments, inter-technology load-balancing for multi-RAT networks may be provided via one or more of RAN selectors 105 and 111. Namely, the spatial positioning of terminal 103 may be monitored in relation to one or more predefined coverage areas corresponding to RANs 101a-101n, such that when device 103 enters (or leaves) one or more coverage areas of one or more RANs, RAN selectors 105 and/or 111 may optimize the loading of those RANs accessible to terminal 103. In this manner, RAN selectors 105 and 111 may further determine loading information corresponding to those RANs accessible to terminal 103, such that a list of candidate RANs from the plurality of RANs accessible to terminal 103 may be output for selection of one or more RANs to support the communications of terminal 103. Generation of a list of candidate RANs is described in more detail in association with FIGS. 3, 5A-5C, and 8. It is noted that selection of a particular candidate RAN to act as a target RAN may be based on one or more selection criteria or conditions, such as candidate RAN loading conditions (e.g., network traffic measurements, threshold values, etc.), spatial positioning of the terminal, handover interruption times for candidate RANs, quality of service (QoS) requirements, signal conditions (e.g., radio frequency signal strength, noise, etc.), requested application service, service policies corresponding to the terminal, preferences of a service provider of system 100, threshold values, application service initialization times, etc. Selection of a target RAN is more fully described with respect to FIGS. 3, 6, and 8. Communication handovers to a target RAN is explained in more detail in conjunction with FIGS. 3, 7, and 8.

In exemplary embodiments, RANs 101a-101n may employ various channel access methods, e.g., code division multiple access (CDMA), direct-sequence spread spectrum (DSSS), frequency division multiple access (FDMA), orthogonal frequency division multiple access (OFDMA), scalable orthogonal frequency division multiple access (SOFDMA), spread spectrum multiple access (SSMA), time division multiple access (TDMA), wideband CDMA (WCDMA), etc. In this manner, one or more RATs may be realized, including, for example, advanced mobile phone system (AMPS), cellular digital packet data (CDPD), circuit switched data (CSD), code division multiple access 2000 (CDMA2000), digital advanced mobile phone system (D-AMPS), enhanced data rates for global evolution (EDGE), evolved universal mobile telecommunications system (E-UMTS), general packet radio service (GPRS), global system for mobile communications (GSM), high rate packet data (HRPD), interim standard 95 (IS-95), internet protocol multimedia subsystem (IMS), third generation partnership project long term evolution (3GPP LTE), third generation partnership project 2 universal mobile broadband (3GPP2 UMB), universal mobile telecommunications system (UMTS), etc., as well as any other suitable wireless medium, such as BLUETOOTH™, Institute of Electrical and Electronic Engineers (IEEE) 802.11 (or wireless fidelity (WIFI™)), IEEE 802.16 (or microwave access (WIMAX™)), IEEE 802.22, satellite, ultra-wideband (UWB), etc.

Accordingly, core network 107 via service provider network 109 enables multi-RAT devices 103 to access one or more application services 113a, 113b,□, 113n. Networks 107 and 109 may be any wireline or wireless network. For example, networks 107 and 109 may include a telephony network (e.g., a circuit-switched network, such as the public switched telephone network (PSTN), an integrated services digital network (ISDN), a private branch exchange (PBX), etc.), a data network (e.g., a packet-switched network, such as a local area network (LAN), metropolitan area network (MAN), wide area network (WAN), the Internet, or any other suitable packet-switched network, such as a commercially owned, proprietary cable, fiber-optic, etc. network), and/or one or more of the aforementioned RAT networks, i.e., one or more of RANs 101a-101n.

Although depicted as separate entities, networks 101a-101n, 107, and 109 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 101a-101n, 107, and 109 may include components and facilities to provide for signaling and/or bearer communications between the various components or facilities of system 100. In this manner, networks 101a-101n, 107, and 109 may embody or include portions of a signaling system 7 (SS7) network, or other suitable infrastructure(s) to support control and signaling functions.

In exemplary embodiments, application services 113a-113n may be any suitable application service, such as voice, data, or video services. For instance, application services 113a-113n may provide for voice communications, video conferencing, video streaming, short or multimedia messaging, best effort services, multimedia playback, global positioning system (GPS) services, video telephony, voice over internet protocol, electronic mail, audio-video capturing, interactive gaming, data manipulation, web browsing, navigating, asset tracking, data storing, file sharing, etc. Essentially, application services 113a-113n may be any conceivable application capable of implementation via suitable terminals 103.

Accordingly, inter-technology load-balancing for multi-RAT networks may be initiated or performed over one or more of networks 101a-101n, 107, and 109 or may be initiated or performed via one or more terminals, such as multi-RAT device 103. As such, suitable terminals may include any mobile or stationary user equipment (UE) capable of sending and/or receiving information over one or more of RANs 101a-101n. In particular, suitable UE may be capable of multi-RAT communication. Accordingly, terminals may include devices, such as, but not limited to, cellular phones, radiophones, satellite phones, smart phones, wireless phones, personal digital assistants having RAT communication capabilities, computing devices having RAT communication capabilities (e.g., personal computer, pocket personal computer, notebook computer, tablet, customized hardware, workstation, server, terminal, etc.), image capturing devices (e.g., digital cameras) having RAT communication capabilities, gaming devices having RAT communication capabilities, music storage and playback appliances having RAT communication capabilities, as well as any other UE or customized hardware incorporating combinations of such functions.

Load information repository 115 may include information corresponding to loading conditions (e.g., network traffic conditions) of RANs 101a-101n of system 100. In this manner, load information repository 115 may further include information relating to network topology (e.g., coverage areas corresponding to RANs 101a-101n, nodes of system 100, RATs of system 100, etc.), QoS requirements (e.g., bandwidth requirements, noise requirements, signal strength requirements, resource capacity requirements, application service initialization requirements, handover interruption requirements, etc.), available application services, preferences of a service provider (e.g., preferences for particular RATs to support particular application services, loading conditions, etc.), and/or more or more suitable parameters of values, such as one or more of those parameters, values, conditions, criteria, etc., described herein.

User profiles repository 117 may include information corresponding to may include information corresponding to the users (or subscribers) of system 100, such as user profile information including information or polices for establishing one or more communication sessions, initiating, performing, or scheduling application services, etc. By way of example, user profile information includes subscription information (e.g., account numbers, usernames, passwords, security questions, monikers, etc.), subscriber demographics (e.g., age, gender, ethnicity, location of residence, zip code, school district, community, socioeconomic status, religion, marital status, ownerships, languages, mobility, life cycles, etc.), group/organizational affiliations (e.g., political), memberships, interests, system configurations, policies, associated users/devices, applicable coverage areas, etc.

In exemplary embodiments, repositories 115 and/or 117 may be maintained by a service provider of system 100 or a suitable third-party, such as a third-party affiliate of the service provider. It is noted that the information stored within repositories 115 and/or 117 may be generated by the service provider, by one or more components or facilities of system 100, by users of system 100, etc. Accordingly, it is contemplated that the physical implementation of repositories 115 and 117 may take on many forms, including, for example, portions of existing repositories of a service provider, new repositories of a service provider, third-party repositories, and/or shared-repositories. As such, repositories 115 and 117 may be configured for communication over system 100 through any suitable messaging protocol, such as lightweight directory access protocol (LDAP), extensible markup language (XML), open database connectivity (ODBC), structured query language (SQL), etc., as well as combinations thereof. In those instances when repositories 115 and 117 are provided in distributed fashions, information and content available via repositories 115 and 117 may be located utilizing any suitable querying technique, such as electronic number matching, distributed universal number discovery (DUNDi), uniform resource identifiers (URI), etc Although only one terminal 103 is shown, it is recognized that inter-technology load-balancing for multi-RAT networks may be implemented for any number of terminals capable of accessing one or more of RANs 101a-101n via one or more of those aforementioned RATs.

Figure 3:
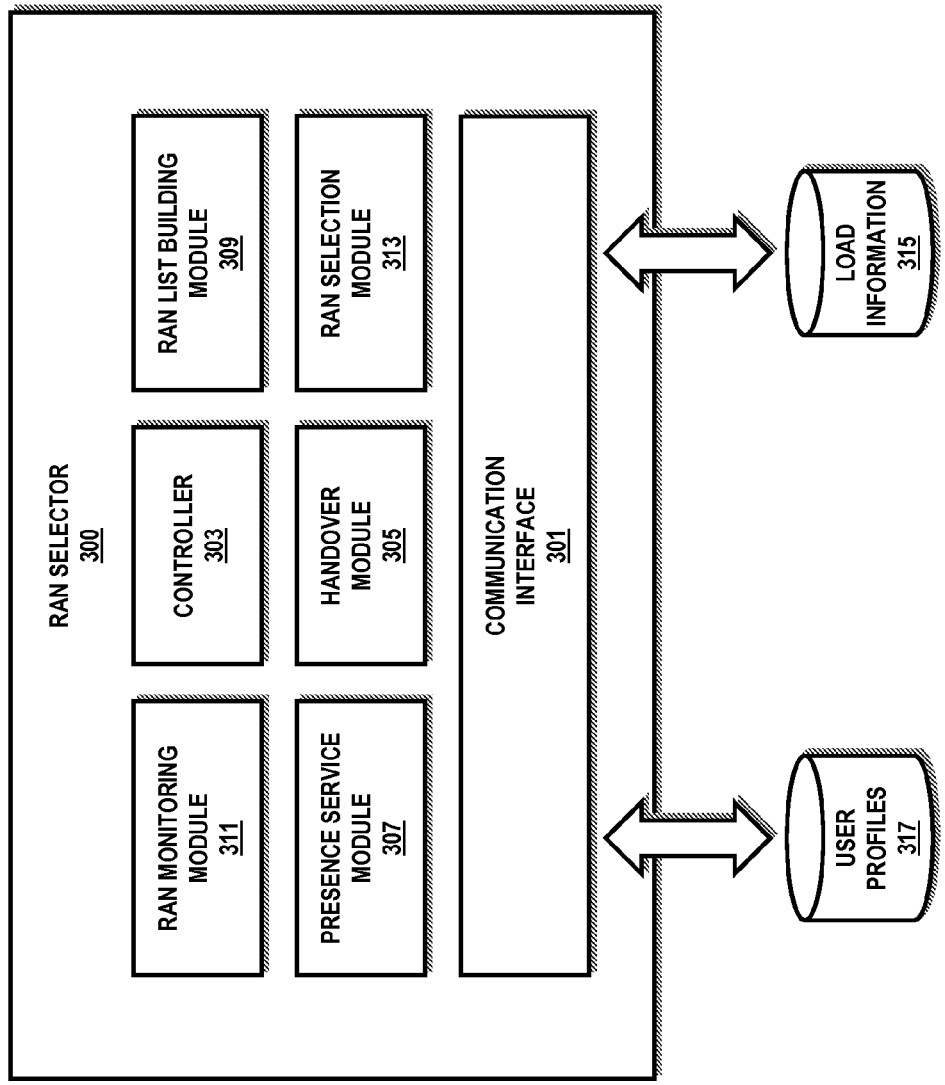
FIG. 3 is a diagram of a radio access network selector configured to provide inter-technology load-balancing between multi-radio access technology networks, according to an exemplary embodiment.

FIG. 3 is a diagram of a radio access network selector configured to provide inter-technology load-balancing between multi-radio access technology networks, according to an exemplary embodiment. RAN selector 300 may comprise computing hardware (such as described with respect to FIG. 8), as well as include one or more components configured to execute the processes described herein for inter-technology load-balancing between multi-RAT networks. In one implementation, RAN selector 300 includes communication interface 301, controller 303, handover module 305, presence service module 307, RAN list building module 309, RAN monitoring module 311, and RAN selection module 313. RAN selector 300 may also communicate with one or more repositories, such as load information repository 315 and user profiles repository 317. It is noted that RAN selector 300 may reside locally within respective terminals, such as RAN selector 105 of device 103, or alternatively (or additionally), may reside remotely over one or more networks (e.g., networks 101a-101n, 107, 109, the Internet (not shown), etc.), such as RAN selector 111. While specific reference will be made to this particular implementation, it is also contemplated that RAN selector 300 may embody many forms and include multiple and/or alternative components. For example, it is contemplated that the components of RAN selector 300 may be combined, located in separate structures, or separate locations.

According to exemplary embodiments, RAN selector 300 is configured to receive real-time positional information corresponding to the respective locations of one or more terminals (e.g., device 103) to determine RANs accessible by terminal 103. It is particularly noted that RANs accessible to terminal 103 may support one or more RATs. In this manner, RAN selector module 300 may be further configured to determine those RATs of a RAN that are accessible by terminal 103. As such, it is contemplated that RANs accessible by terminal 103 may relate to RANs of a particular RAT or RANs of one or more RATs. Real-time positional information may be obtained from terminals 103 and, thereby, tracked via presence service module 307. Additionally (or alternatively), presence service module 307 may "poll" terminals 103 for real-time positional information, as well as capture presence information or availability of terminals 103. An exemplary model for presence determination is detailed in Internet Engineering Task Force (IETF) Request for Comment (RFC) 2778, which is incorporated herein by reference in its entirety. According to certain embodiments, the presence or availability of terminals 103 may be utilized to effectuate the processes described herein, such as utilized by RAN list building module 309 to generate a list of candidate RANs accessible by a terminal, such as device 103. It is noted that the list of candidate RANs may include a list of one or more RANs of a particular RAT and/or a list of one or more RANs of one or more RATs. As such, it is contemplated that RAN list building module 309 may generate a matrix of RANs and RATs accessible to a terminal. For instance, the rows of a generated matrix may relate to RANs accessible to the terminal in a manner that the columns of the rows may relate to RATs of RANs accessible to the terminal; however, the converse may also be applied. Null (or zero) values may be utilized as place holder entries within a generated matrix when a particular RAN of system 100 implements less RATs than the RAN of system 100 that implements the most RATs. An exemplary matrix is provided below:

$$\begin{bmatrix} RAN_{1,1} & RAN_{1,2} & \ldots & RAN_{1,j} & \ldots & RAN_{1,m-1} & RAN_{1,m} \\ RAN_{2,1} & RAN_{2,2} & \ldots & RAN_{2,j} & \ldots & RAN_{2,m-1} & RAN_{2,m} \\ \vdots & \ddots & \ddots & \ddots & \ddots & \ddots & \vdots \\ RAN_{i,1} & RAN_{i,2} & \ldots & RAN_{i,j} & \ldots & RAN_{i,m-1} & RAN_{i,m} \\ \vdots & \ddots & \ddots & \ddots & \ddots & \ddots & \vdots \\ RAN_{n-1,1} & RAN_{n-1,2} & \ldots & RAN_{n-1,j} & \ldots & RAN_{n-1,m-1} & RAN_{n-1,m} \\ RAN_{n,1} & RAN_{n,2} & \ldots & RAN_{n,j} & \ldots & RAN_{n,m-1} & RAN_{n,m} \end{bmatrix}$$

where:
i=Particular RAN that is Accessible by a Terminal;
  i∈[1,n]
j=Particular RAT of a Particular RAN that is Accessible by a Terminal;
  j∈[1,m]
n=Total Number of RANs that are Accessible by a Terminal
m=Maximum Number of RATs implemented by the RAN implementing the most RATs that is Accessible to a Terminal It is also noted that a generated matrix may be alternatively (or additionally) represented as a vector. For example, the aforementioned exemplary matrix may be defined as a vector as follows:

[$RAN_1, RAN_2, \ldots, RAN_i, \ldots, RAN_{n-1}, RAN_n$] where:

$RAN_1$ = [$RAN_{1,1}, RAN_{1,2}, \ldots, RAN_{1,j}, \ldots, RAN_{1,m-1}, RAN_{1,m}$]

$RAN_2$ = [$RAN_{2,1}, RAN_{2,2}, \ldots, RAN_{2,j}, \ldots, RAN_{2,m-1}, RAN_{2,m}$]

⋮ ⋮ ⋮

$RAN_i$ = [$RAN_{i,1}, RAN_{i,2}, \ldots, RAN_{i,j}, \ldots, RAN_{i,m-1}, RAN_{i,m}$]

⋮ ⋮ ⋮

$RAN_{n-1}$ = [$RAN_{n-1,1}, RAN_{n-1,2}, \ldots, RAN_{n-1,j}, \ldots, RAN_{n-1,m-1}, RAN_{n-1,m}$]

$RAN_n$ = [$RAN_{n,1}, RAN_{n,2}, \ldots, RAN_{n,j}, \ldots, RAN_{n,m-1}, RAN_{n,m}$]

For the sake of simplicity, the designation of a particular RAN is to be assumed, hereinafter, to include the designation of a RAN implementing one or more RATs. In this manner, when a particular RAT is referred to, it may designate one or more particular RATs.

According to exemplary embodiments, presence and real-time positional information corresponding to the respective locations (or spatial positions) of terminals 103 may be utilized by RAN list building module 309. Namely, RAN list building module 309 may dynamically correlate the real-time spatial position (or location) of respective terminals 103 to one or more predefined coverage areas corresponding to RANs 101a-101n and stored to, for example, load information repository 315. It is noted that spatial positions and/or coverage areas can be associated with respective terminals and, thereby, may be specified within one or more user profiles stored to, for example, user profiles repository 317. Further, the one or more coverage areas and/or spatial positions may be additionally (or alternatively) stored to one or more other storage locations of system 100, such as one or more memories (not shown) or repositories (not illustrated) of RAN selector 300 or of terminals 103. It is noted that these storage locations may be synchronized. In this manner, RAN list building module 309 may receive (or retrieve) one or more coverage areas and/or spatial positions from one or more of the aforementioned storage locations, or may query presence service module 307 and/or communication interface 301 to acquire this information.

According to certain embodiments, RAN list building module 309 and/or presence service module 307 may correlate the spatial position of terminal 103 to predefined coverage areas by determining a distance from the spatial position to an epicenter of the coverage area. If the absolute value of the distance is less than the radius of applicability, terminal 103 can be assumed to be within the coverage area of a particular RAN, whereas if the absolute value of the distance is greater than the radius of applicability of a particular coverage area, then mobile device 101 can be assumed to not be within the coverage area of the particular RAN. It is contemplated, however, that coverage areas may alternatively defined (i.e., may be defined by configurations other than circular regions. As such, any other suitable method for determining whether terminal 103 is within a predefined coverage area may be utilized, such as by other geometric techniques, comparing spatial coordinates, pinging requests, etc.

Based on those RANs accessible to terminal 103, RAN list building module 309 may determine whether particular ones of the RANs accessible by terminal 103 support an application service requested by terminal 103. Determination of the requested application service may be based on an indication (e.g., application service request) transmitted to an iRAN, e.g., iRAN 101a, and, thereby, transmitted to RAN selector 111. According to certain embodiments, service provider network 109 may transmit information corresponding to the requested application service to RAN selector 111. If a particular RAN accessible to terminal 103 does not support the requested application service, RAN list building module 309 can remove that RAN from a list of candidate RANs to be generated by RAN list building module 309.

According to other embodiments, RAN list building module 309 may determine one or more application service initialization times, which may account for handover interruption times (e.g., the amount of time allotted to handing off communications from an iRAN to a candidate RAN capable of supporting the application service). In this manner, RAN list building module 309 via, for example, communication interface 301, may retrieve one or more predetermined threshold values from load information repository 315 or any other suitable storage location of system 100, such as one or more memories (not shown) or repositories (not illustrated) of RAN selector 300 or of terminals 103, etc. Accordingly, RAN list building module 309 may dynamically compare the determined application initialization times with the predetermined threshold values, such that particular ones of the RANs accessible to terminal 103 may be removed from a list of candidate RANs if determined application initialization times for the particular ones of the RANs satisfy particular predetermined threshold values, e.g., a determined application initialization time is greater than a particular threshold value.

Similarly, RAN list building module 309 may determine one or more QoS parameter values, one or more service policy values corresponding to terminal 103, etc., based on information stored to, for example, user profiles repository 317. It is noted that these QoS parameter values, service policies, etc., may be stored to any other suitable storage location of system 100, such as one or more memories (not shown) or repositories (not illustrated) of RAN selector 300 or of terminals 103, etc. In this manner, the QoS parameter values, service policies, etc., as well as threshold values corresponding to these QoS parameter values, service policies, etc., may be retrieved by RAN list building module 309 via, for example, communication interface 301. Accordingly, RAN list building module 309 may dynamically compare one or more of the QoS parameter values, service policy values, etc., with corresponding predetermined threshold values or RAN signaling conditions acquired from, for example, terminal 103, such that particular ones of the RANs accessible to terminal 103 may be removed from a list of candidate RANs if QoS parameter values, service policies, etc., for the particular ones of the RANs satisfy particular predetermined threshold values.

In exemplary embodiments, real-time traffic loading of a particular candidate RAN ( ) $cRAN_i$ may be defined as xi, where i=1, 2, □, N, and may be obtained by RAN monitoring module 311 through the exchange of suitable communications between an iRAN (e.g., RAN 101a) and $cRAN_i$ or via suitable over-the-air (OTA) measurements. For instance, RAN list building module 309 may transmit a list of candidate RANs to terminal 103, wherein terminal 103 may perform suitable OTA measurements and, thereby, provide RAN monitoring module 311 and/or RAN list building module 309 with real-time traffic loading information corresponding to one or more of the entries within the list of candidate RANs.

Communication interface 301 may facilitate these communications and/or measurements. In this manner, a target RAN ($RAN_t$) may be determined by RAN selection module 313 from a plurality of candidate RANs based on available resources of candidate RANs, one or more application service requirements (e.g., QoS requirements, service policy requirements corresponding to terminals 103), and/or one or more preferences of a service provider of system 100. Accordingly, selection of $RAN_t$ by RAN selection module 313 may be based on Equations (1)-(4), defined as follows:

$$RAN_t = U(\overline{X}, \overline{C}, \overline{W}_{AS}) \qquad (1)$$

$$\overline{X} = (x_1, x_2, \ldots, x_i, \ldots, x_{N-1}, x_N) \qquad (2)$$

$$\overline{C} = (C_1, C_2, \ldots, C_i, \ldots, C_{N-1} C_N) \qquad (3)$$

$$\overline{W}_{AS} = (\omega_{AS}^{(1)}, \omega_{AS}^{(2)}, \ldots, \omega_{AS}^{(i)}, \ldots, \omega_{AS}^{(N-1)}, \omega_{AS}^{(N)}), \qquad (4)$$

where:

RAN$_t$=Target RAN

U=Optimization Equation $\overline{X}$=Loading Matrix (or Vector) Defining Usage (e.g., Real-Time Usage) of System Resources $\overline{C}$=Multi-RAN Capacity Matrix (or Vector) Constraining (or Otherwise Defining) System Resources $\overline{W}_{AS}$=Weighting Matrix (or Vector) for Preferring Particular RATs for Particular Application Services As different RANs may implement different RATs, units of capacity for the particular RATs may be different. For example, CDMA-based RANs are interference limited and, therefore, an overall capacity of a particular CDMA-based RAN may be defined in terms of rise over thermal (RoT) values. Meanwhile, an FDMA-based RAN may be bandwidth limited and, therefore, an overall capacity of a particular FDMA-based RAN may be defined in terms of overall system bandwidth, such as a total number of carriers. These and other exemplary RAT-based overall capacity definitions are provided below in Equations (7)-(10). Hence, a universal loading matrix (or vector) of multi-RAT system 100 may be defined by RAN selection module 313 according to Equations (5) and (6), defined as follows:

$$\overline{\Psi} = (\psi_i) \tag{5}$$

$$(\psi_i) = \left(\frac{x_1}{C_1}, \frac{x_2}{C_2}, \ldots, \frac{x_i}{C_i}, \ldots, \frac{x_{N-1}}{C_{N-1}}, \frac{x_N}{C_N}\right) \tag{6}$$

where:

$\overline{\Psi}$=Universal Loading Matrix (or Vector) for Multi-RAT System $\psi_i$=Overall Capacity of a Particular Candidate RAN that Implements a Particular RAT i=Particular Candidate RAN N=Total Number of Candidate RANs As previously mentioned, various exemplary RAT-based overall capacities are defined below in Equations (7)-(10_. It is noted that while particular RAT-based overall capacities are provided, any suitable or equivalent overall capacity definition for suitable RATs are contemplated.

For CDMA RANs:

$$\psi_{CDMA} = \frac{RoT_m}{\max RoT} \tag{7}$$

where:

$\psi_{CDMA}$=Overall Capacity of a Particular CDMA RAN

RoT$_m$=Measured (or "Current") Rise Over Thermal of the Particular max RoT=Maximum (or "Capable") Rise Over Thermal of the Particular CDMA RAN For FDMA RANs:

$$\psi_{FDMA} = \frac{C_{used}}{C_{total}} \tag{8}$$

where:

$\psi_{FDMA}$=Overall Capacity of a Particular FDMA RAN $C_{used}$=Number of Carriers of the Particular FDMA RAN Being Utilized $C_{total}$=Total Number of "Possible" Carriers of the Particular FDMA RAN For TDMA RANs:

$$\psi_{TDMA} = \frac{TS_{used}}{TS_{total}} \tag{9}$$

where:

$\psi_{TDMA}$=Overall Capacity of a Particular TDMA RAN

TS$_{used}$=Number of Time Slots of the Particular TDMA RAN Being Utilized

TS$_{total}$=Total Number of "Possible" Time Slots of the Particular TDMA RAN

For OFDM RANs:

$$\psi_{OFDM} = \frac{TFB_{used}}{TFB_{total}} \tag{10}$$

where:

$\psi_{OFDM}$=Overall Capacity of a Particular OFDM RAN

TFB$_{used}$=Number of Time-Frequency Blocks of the Particular OFDM RAN Being Utilized TFB$_{total}$=Total Number of "Possible" Time-Frequency Blocks of the Particular OFDM RAN Accordingly, RAN selection module 313 may define (or retrieve from, for example, load information repository 315) available resources coefficients for each candidate RAN based on Equations (11) and (12), defined as follows:

$$\mu_i = \begin{array}{l} 1 - \psi_i, \\ i \in [1, N] \end{array} \tag{11}$$

$$\mu_i = \begin{array}{l} 1 - \left(\frac{x_i}{C_i}\right), \\ i \in [1, N] \end{array} \tag{11}$$

where:

$\mu_i$=Available Resources Coefficient for a Particular Candidate RAN that Implements a Particular RAT i=Particular Candidate RAN N=Total Number of Candidate RANs It is noted that Equations (11) and (12) define available resources coefficients in terms of available resources that are available "before" the addition of network traffic associated with communications between terminal 103 and a requested application service. In other embodiments, available resources coefficients may be defined in terms of available resources that are available "after" or "before and after" the addition of network traffic associated with communications between terminal 103 and a requested application service. These "other" scenarios are more fully described in relation to Equations (22)-(24) and (32)-(34), respectively, as well as the accompanying passages.

Based on the available resource coefficients defined in Equations (11) and (12), RAN selection module 313 can generate an available resource coefficient matrix (or vector) as in Equation (23). It is generally noted that available resource coefficient matrices (or vectors) may be also considered (or termed) as universal loading indicators for system 100. As such, Equation (13) may be defined as follows:

$$\overline{U} = (\mu_1, \mu_2, \ldots, \mu_i, \ldots, \mu_{N-1}, \mu_N)$$

where:
  $\overline{U}$=Available Resource Coefficient Matrix (or Vector) for Multi-RAT System
  $\mu_i$=Available Resources Coefficient for a Particular Candidate RAN that Implements a Particular RAT
  i=Particular Candidate RAN
  N=Total Number of Candidate RANs Assuming a non-biased policy for a requested application service, i.e., a service provider of system 100 does not prefer particular RATs to support particular application services, then $\overline{W}_{AS}$ of Equation (4) may be generated by RAN selection module 313 as in Equation (14), defined as follows:

$$\overline{W}_{AS} = (1, 1, \ldots, 1, \ldots, 1, 1) \quad (14)$$

Accordingly, $RAN_t$ of Equation (1) may be determined by RAN selection module 313 based on the argument of Equation (15), defined as follows:

$$RAN_t = \arg\max_{i \in \{1,2,3,\ldots,N\}} \{\mu_1, \mu_2, \ldots, \mu_i, \ldots, \mu_{N-1}, \mu_N\} \quad (15)$$

Assuming a biased policy for a requested application service, i.e., a service provider of system 100 prefers particular RATs for particular application services, then $RAN_t$ may be determined by RAN selection module 313 based on the argument of Equation (16), defined as follows:

$$RAN_t = \arg\max_{i \in \{1,2,3,\ldots,N\}} \{\mu_1 \omega_{AS}^{(1)}, \mu_2 \omega_{AS}^{(2)}, \ldots, \mu_i \omega_{AS}^{(i)}, \ldots, \mu_{N-1} \omega_{AS}^{(N-1)}, \mu_N \omega_{AS}^{(N)}\} \quad (16)$$

It is noted that the preferences of a service provider, i.e., the $\omega_{AS}^{(i)}$ elements, may be stored to and, thereby, retrieved from load information repository 315 by RAN selection module 313 via communication interface 301. Alternatively (or additionally) these preferences may be stored to any other suitable storage location of system 100, such as a memory or repository of (or accessible to) RAN selector 300, a memory or repository of (or accessible to) terminal 103, etc.

According to exemplary embodiments, RAN selection module 313 may subject the arguments of Equations (15) and (16) to one or more constraints, such as one or more predetermined threshold values, e.g., one or more resource requirements, for example, one or more QoS requirements, service policies related to terminal 103, handover interruption times, etc., that may be configured to prevent overloading a particular candidate RAN and, thereby, enable a margin for network traffic fluctuations, as well as allow for handover buffers. In this manner, the arguments of Equations (15) and (16) may, in exemplary embodiments, be subjected to the constraints of Equation (17) by RAN selection module 313. While particular constraints are enumerated, it is contemplated that any number or other suitable types of constraints may be imposed by RAN selection module 313. Equation (17) may be defined as follows:

$$\delta_k \leq \mu_k - \frac{\gamma}{C_k}, \quad (17)$$
$$\delta_k \in [0, 1]$$

where:
  $\gamma$=Resource Requirement of Requested Application Service
  $\mu_k$=Desired Available Resource Coefficient for Target RAN
  $C_k$=Desired Capacity for Target RAN
  $\delta_k$=Predetermined Constant for Target RAN
  k=Target RAN Thus, a target RAN may be determined by RAN selection module 313, based on the list of candidate RANs generated by RAN list building module 309, by determining a particular RAN with a most (or maximum amount of) available network resources subject to one or more of the aforementioned constraints and/or preferences. As noted, this target RAN would be selected based on accounting for the effects of available resources "before" admission of terminal 103 to particular candidate RANs.

For example, terminal 103 may initiate a request for a voice-over-internet-protocol (VoIP) application service (e.g., application service 113a) at RAN 101a functioning as an iRAN. In this manner, iRAN 101a or, more specifically, RAN selector 111, may direct the VoIP application service to a particular target RAN, e.g., RAN 101b. Accordingly, $\overline{W}_{AS}$ of Equation (4) may be defined as $\overline{W}_{VoIP}$ and, thereby, may include preference weighting elements $\omega_{VoIP}^{(i)}$ defined in Equation (18) as follows:

$$\omega_{VoIP}^{(i)} = \begin{cases} 0 & i \neq h \\ 1 & i = h \end{cases}, \quad (18)$$
$$h \in [1, N]$$

where:
  $\omega_{VoIP}^{(i)}$=Particular Weighting Matrix (or Vector) Element for the Requested VoIP Application Service
  h=Particular Candidate RAN
  N=Total Number of Candidate RANs Thus, a target RAN for the requested VoIP application service may be denoted according to Equations (19)-(21), which may be defined as follows:

$$RAN_t |_{AS=VoIP} = \arg\max_{i \in \{1,2,3,\ldots,N\}} \quad (19)$$
$$\{\mu_1 \omega_{VoIP}^{(1)}, \mu_2 \omega_{VoIP}^{(2)}, \ldots, \mu_i \omega_{VoIP}^{(i)}, \ldots, \quad (20)$$
$$\mu_{N-1} \omega_{VoIP}^{(N-1)}, \mu_N \omega_{VoIP}^{(N)}\}$$
$$= \arg\max_{i \in \{1,2,3,\ldots,N\}} \{0, 0, \ldots, \mu_h, \ldots, 0, 0\} \quad (21)$$
$$= h$$

where:

RAN$_t|_{AS=VoIP}$=Target RAN for Requested VoIP Application Service

μ$_h$=Available Resource Coefficient for the Particular Candidate RAN to be Targeted as the Target RAN h=Particular Candidate RAN to be Targeted as the Target RAN Hence, the target RAN for the requested VoIP application service of this example is RAN$_h$. It is noted that once RAN$_h$ is determined as RAN$_t|_{AS=VoIP}$, then handover procedures may be initiated (or otherwise performed) by handover module 305, i.e., between and among iRAN 101a, RAN$_h$, e.g., RAN 101b, and terminal 103. This enables to provide the requested VoIP application to terminal 103 in an optimized manner.

As previously mentioned, available resources coefficients may be alternatively defined by RAN selection module 313. For example, to take into account the effects on available resources "after" network traffic associated with terminal 103 is provisioned to a candidate RAN, the available resources coefficient of a particular candidate RAN may be defined by RAN selection module 313 as in Equations (22) and (23), as follows:

$$v_i = \begin{matrix} 1 - \psi_i, \\ i = 1, 2, \cdots, N \end{matrix} \quad (22)$$

$$= \begin{matrix} 1 - \frac{x_i + \gamma}{C_i}, \\ i = 1, 2, \cdots, N \end{matrix} \quad (23)$$

where:

$v_i$=Available Resources Coefficient of a Particular Candidate RAN $x_i$=Load of the Particular Candidate RAN $C_i$=Capacity of the Particular Candidate RAN γ=Resource Requirement of a Requested Application Service i=Particular Candidate RAN N=Total Number of Candidate RANs In this manner, the available resource coefficient matrix (or vector) of Equation (13) may be defined by RAN selection module 313 as Equation (24), based on Equations (22) and (23). Equation (24) may be defined as follows:

$$\overline{V} = (v_1, v_2, \ldots, v_i, \ldots, v_{N-1}, v_N) \quad (24)$$

where:

$\overline{V}$=Available Resource Coefficient Matrix (or Vector) for Multi-RAT System Assuming a non-biased policy for the requested application service, i.e., a service provider of system 100 does not prefer particular RATs to support particular application services, then $\overline{W}_{AS}$ of Equation (4) may be generated by RAN selection module 313 as in Equation (14), and RAN$_t$ of Equation (1) may be determined by RAN selection module 313 based on the argument of Equation (25), defined as follows:

$$RAN_t = \arg\max_{i \in \{1,2,3,\ldots,N\}} \{v_1, v_2, \ldots, v_i, \ldots, v_{N-1}, v_N\} \quad (25)$$

Assuming a biased policy for the requested application service, i.e., a service provider of system 100 prefers particular RATs for particular application services, then RAN$_t$ may be determined by RAN selection module 313 based on the argument of Equation (26), defined as follows:

$$RAN_t = \arg\max_{i \in \{1,2,3,\ldots,N\}} \{v_1 \omega_{AS}^{(1)}, v_2 \omega_{AS}^{(2)}, \ldots, \\ v_i \omega_{AS}^{(i)}, \ldots, v_{N-1} \omega_{AS}^{(N-1)}, v_N \omega_{AS}^{(N)}\} \quad (26)$$

As previously mentioned, the preferences of a service provider, i.e., $\omega_{AS}^{(i)}$ elements, may be stored to and, thereby, retrieved from load information repository 315 by RAN selection module 313 via communication interface 301. Alternatively (or additionally) these preferences may be stored to any other suitable storage location of system 100, such as a memory or repository of (or accessible to) RAN selector 300, a memory or repository of (or accessible to) terminal 103, etc.

According to exemplary embodiments, RAN selection module 313 may subject the arguments of Equations (25) and (26) to one or more constraints, such as one or more predetermined threshold values, e.g., one or more resource requirements, for example, one or more QoS requirements, service policies related to terminal 103, handover interruption times, etc., that may be configured to prevent overloading a particular candidate RAN and, thereby, enable a margin for network traffic fluctuations, as well as allow for handover buffers. In this manner, the arguments of Equations (25) and (26) may, in exemplary embodiments, be subjected to the constraints of Equation (27) by RAN selection module 313. Again, while particular constraints are enumerated, it is contemplated that any number or other suitable types of constraints may be imposed by RAN selection module 313. Equation (27) may be defined as follows:

$$v_k \geq \begin{matrix} \delta_k, \\ \delta_k \in [0, 1] \end{matrix} \quad (27)$$

where:

$v_k$=Desired Available Resource Coefficient for Target RAN $\delta_k$=Predetermined Constant for Target RAN k=Target RAN Thus, a target RAN may be determined by RAN selection module 313, based on the list of candidate RANs generated by RAN list building module 309, by determining a particular candidate RAN with a most (or maximum amount of) available network resources subject to one or more of the aforementioned constraints and/or preferences. As noted, this target RAN would be selected based on accounting for the effects of available resources "after" admission of terminal 103 to particular candidate RANs.

For example, terminal 103 may initiate a request for a short message service (SMS) application (e.g., application service 113b) from RAN 101a functioning as an iRAN. In this manner, iRAN 101a or, more specifically, RAN selector 111, may direct the SMS application to a particular target RAN, e.g., RAN 101n. Accordingly, $\overline{W}_{AS}$ of Equation (4) may be defined as $\overline{W}_{SMS}$ and, thereby, may include preference weighting elements $\omega_{SMS}^{(i)}$ defined in Equation (28) as follows:

$$\omega_{SMS}^{(i)} = \begin{cases} 0 & i \neq h \\ 1 & i = h \end{cases}, \quad (28)$$

$$h \in [1, N]$$

where:
$\omega_{SMS}^{(i)}$=Particular Weighting Matrix (or Vector) Element for the Requested SMS Application
h=Particular Candidate RAN
N=Total Number of Candidate RANs Thus, a target RAN for the requested SMS application may be denoted according to Equations (29)-(31), which may be defined as follows:

$$RAN_t \mid_{AS=SMS} = \arg\max_{i \in \{1,2,3,\ldots,N\}} \{v_1 \omega_{SMS}^{(1)}, v_2 \omega_{SMS}^{(2)}, \ldots v_i \omega_{SMS}^{(i)}, \ldots , \quad (29)$$
$$v_{N-1} \omega_{SMS}^{(N-1)}, v_N \omega_{SMS}^{(N)}\}$$

$$= \arg\max_{i \in \{1,2,3,\ldots,N\}} \{0, 0, \ldots, v_h, \ldots, 0, 0\} \quad (30)$$

$$= h \quad (31)$$

where:
$RAN_t \mid_{AS=SMS}$=Target RAN for Requested SMS Application be Targeted as the Target RAN
$v_h$ Available Resource Coefficient for the Particular Candidate RAN to
h=Particular Candidate RAN to be Targeted as the Target RAN Hence, the target RAN for the requested SMS application of this example is $RAN_h$. It is noted that once $RAN_h$ is determined as $RAN_t \mid_{AS=SMS}$, then handover procedures may be initiated (or otherwise performed) by handover module 305, i.e., between and among iRAN 101a, $RAN_h$, e.g., RAN 101b, and terminal 103. This enables $RAN_h$ to provide the requested SMS application to terminal 103 in an optimized manner.

In order for RAN selection module 313 to take into account the generalized effects "before and after" network traffic associated with terminal 103 is provisioned to a candidate RAN, the available resources coefficient of a particular candidate RAN may be defined by RAN selection module 313 as in Equations (32) and (33), as follows:

$$\lambda_i = \begin{array}{l} 1 - \psi_i - \dfrac{a\gamma}{C_i}, \\ i = 1, 2, \cdots, N, \\ a \in [0, 1] \end{array} \quad (32)$$

$$= \begin{array}{l} 1 - \dfrac{x_i + a\gamma}{C_i}, \\ i = 1, 2, \cdots, N, \\ a \in [0, 1] \end{array} \quad (33)$$

where:
$\lambda_i$=Available Resources Coefficient of a Particular Candidate RAN
$x_i$=Load of the Particular Candidate RAN
$C_i$=Capacity of the Particular Candidate RAN
$\gamma$=Resource Requirement of a Requested Application Service
a=Predetermined Constant
i=Particular Candidate RAN
N=Total Number of Candidate RANs In this manner, the available resource coefficient matrix (or vector) of Equation (13) may be defined by RAN selection module 313 as a generalized available resource coefficient matrix (or vector) in Equation (34), which may be defined as follows:

$$\Gamma = \lambda_1, \lambda_2, \ldots, \lambda_i, \ldots, \lambda_{N-1}, \lambda_N \quad (34)$$

where:
$\Gamma$=Generalized Available Resource Matrix (or Vector) for Multi-RAT System It is noted that when a=0, only the effects on available resources "before" network traffic associated with terminal 103 is provisioned to a candidate RAN are considered, while when a=1, only the effects on available resources "after" network traffic associated with terminal 103 is provisioned to a candidate RAN are considered.

Thus, assuming a non-biased policy for a requested application service, i.e., a service provider of system 100 does not prefer particular RATs to support particular application services, then $W_{AS}$ of Equation (4) may be generated by RAN selection module 313 as in Equation (14), and $RAN_t$ of Equation (1) may be determined by RAN selection module 313 based on the argument of Equation (35), defined as follows:

$$RAN_t = \arg\max_{i \in \{1,2,3,\ldots,N\}} \{\lambda_1, \lambda_2, \ldots, \lambda_i, \ldots, \lambda_{N-1}, \lambda_N\} \quad (35)$$

Assuming a biased policy for the requested application service, i.e., a service provider of system 100 prefers particular RATs for particular application services, then $RAN_t$ may be determined by RAN selection module 313 based on the argument of Equation (36), defined as follows:

$$RAN_t = \arg\max_{i \in \{1,2,3,\ldots,N\}} \{\lambda_1 \omega_{AS}^{(1)}, \lambda_2 \omega_{AS}^{(2)}, \ldots, \lambda_i \omega_{AS}^{(i)}, \ldots , \quad (36)$$
$$\lambda_{N-1} \omega_{AS}^{(N-1)}, \lambda_N \omega_{AS}^{(N)}\}$$

Again, the preferences of a service provider, i.e., $\omega_{AS}^{(i)}$ elements, may be stored to and, thereby, retrieved from load information repository 315 by RAN selection module 313 via communication interface 301. Alternatively (or additionally) these preferences may be stored to any other suitable storage location of system 100, such as a memory or repository of (or accessible to) RAN selector 300, a memory or repository of (or accessible to) terminal 103, etc.

According to exemplary embodiments, RAN selection module 313 may subject the arguments of Equations (35) and (36) to one or more constraints, such as one or more predetermined threshold values, e.g., one or more resource requirements, for example, one or more QoS requirements, service policies related to terminal 103, handover interruption times, etc., that may be configured to prevent overloading of a particular candidate RAN and, thereby, enable a margin for network traffic fluctuations, as well as allow for handover buffers. In this manner, the arguments of Equations (35) and (36) may, in exemplary embodiments, be subjected to the constraints of Equation (37) by RAN selection module 313. As previously noted, while particular constraints are enumerated, it is contemplated that any number or other suitable types of constraints may be imposed by RAN selection module 313. Equation (37) may be defined as follows:

$$\lambda_k\bigg|_{a=1} \geq \begin{matrix} \delta_k, \\ \delta_k \in [0, 1] \end{matrix} \qquad (37)$$

where:
$\delta_k|_{a=1}$=Desired Maximum Available Resource Coefficient for Target RAN After Admission of Application Service
$\delta_k$=Predetermined Constant for Target RAN
k=Target RAN Thus, a target RAN may be determined by RAN selection module 313, based on the list of candidate RANs generated by RAN list building module 309, by determining a particular candidate RAN with a most (or maximum amount of) available network resources subject to one or more of the aforementioned constraints and/or preferences. As noted, this target RAN would be selected based on accounting for the effects of available resources "before and after" admission of terminal 103 to particular candidate RANs.

For example, terminal 103 may request a global positioning service (GPS) application (e.g., application service 113n) from RAN 101a functioning as an iRAN. In this manner, iRAN 101a or, more specifically, RAN selector 111, may direct the GPS application to a particular target RAN, e.g., RAN 101b. Accordingly, $\overline{W}_{AS}$ of Equation (4) may be defined as $\overline{W}_{GPS}$ and, thereby, may include preference weighting elements $\omega_{GPS}^{(i)}$ defined in Equation (38) as follows:

$$\omega_{GPS}^{(i)} = \begin{cases} 0 & i \neq h \\ 1 & i = h \end{cases}, \qquad (38)$$
$$h \in [1, N]$$

where:
$\omega_{GPS}^{(i)}$=Particular Weighting Matrix (or Vector) Element for the Requested GPS Application
h=Particular Candidate RAN
N=Total Number of Candidate RANs Thus, a target RAN for the requested GPS application may be denoted according to Equations (39)-(41), which may be defined as follows:

$$RAN_t\bigg|_{AS=GPS} = \arg\max_{i \in \{1,2,3,...N\}}\{\lambda_1\omega_{GPS}^{(1)}, \ldots, \lambda_1\omega_{GPS}^{(2)}, \ldots, \lambda_1\omega_{GPS}^{(i)}, \ldots, \lambda_{N-1}\omega_{GPS}^{(N-1)}, \lambda_N\omega_{GPS}^{(N)}\} \qquad (39)$$

$$= \arg\max_{i \in \{1,2,3,...N\}}\{0, 0, \ldots, \lambda_h, \ldots, 0, 0\} \qquad (40)$$

$$= h \qquad (41)$$

where:
$RAN_t|_{AS=GPS}$=Target RAN for Requested GPS Application
$\lambda_h$=Available Resource Coefficient for the Particular Candidate RAN to be Targeted as the Target RAN
h=Particular Candidate RAN to be Targeted as the Target RAN Hence, the target RAN for the requested GPS application of this example is $RAN_h$. It is noted that once $RAN_h$ is determined as $RAN_t|_{AS=GPS}$, then handover procedures may be initiated (or otherwise performed) by handover module 305, i.e., between and among iRAN 101a and $RAN_h$, e.g., RAN 101b, and terminal 103. This enables RAN 101b to provide the requested GPS application to terminal 103 in an optimized manner.

Additionally, RAN selector 300 may include one or more processors (or controllers) 303 for effectuating the processes described herein, as well as one or more memories (not shown) for permanent or temporary storage of one or more of the previously described equations, coverage areas, control commands, QoS parameters, service policy parameters, user profile information, threshold values, variables, etc.

Figure 4:
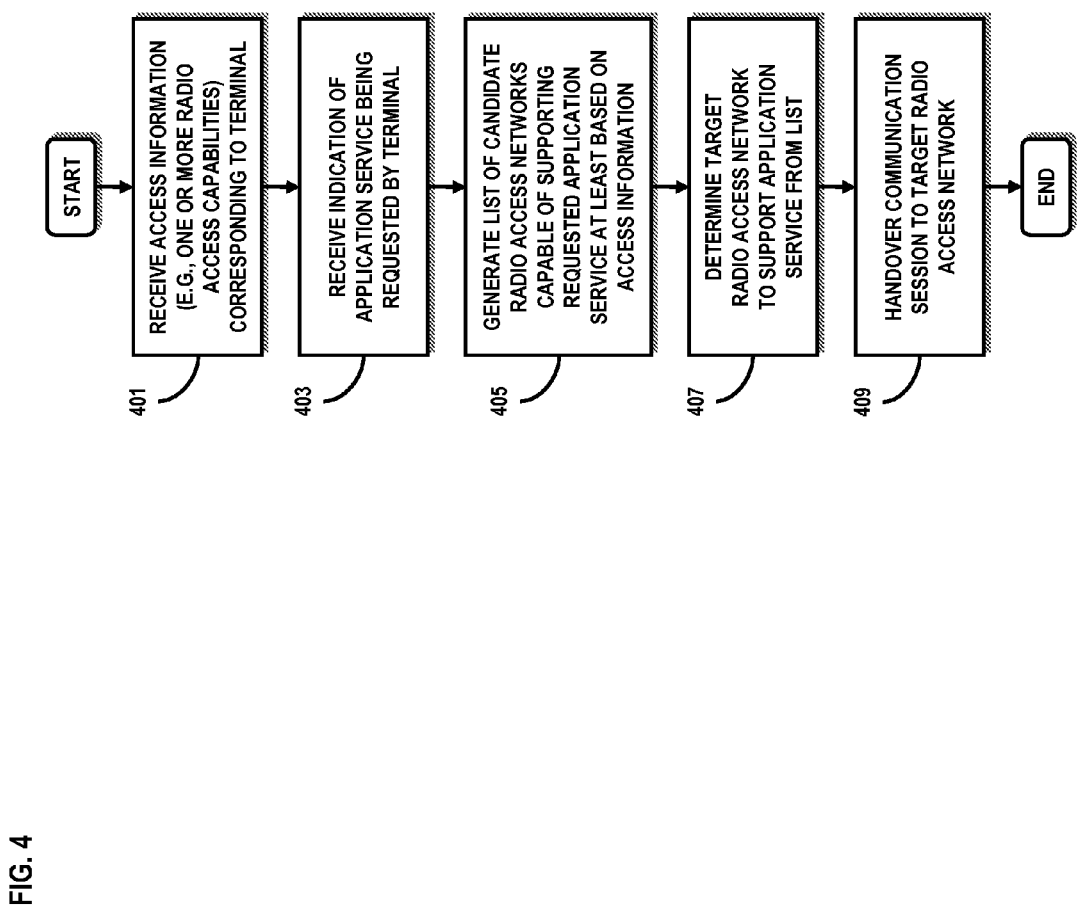
FIG. 4 is a flowchart of a process for inter-technology load-balancing for multi-radio access technology networks, according to an exemplary embodiment.

FIG. 4 is a flowchart of a process for inter-technology load-balancing for multi-radio access technology networks, according to an exemplary embodiment. For the purposes of illustration, the process is described with respect to FIGS. 1 and 3. It is further noted that while the process is explained with reference to RAN selector 111, it is also contemplated that RAN selector 105 or the conjunction of RAN selectors 105 and 111 may implement the process. At step 401, terminal 103 transmits access information, i.e., one or more radio access capabilities of terminal 103, to RAN 101a that is, according to exemplary embodiments, an interworking capable RAN (iRAN). Namely, for RAN 101a to be characterized as an iRAN, RAN 101a includes or has access to RAN selector 111. It is noted that terminal 103 may transmit the access information to iRAN 101a at various stages depending on the specification parameters of a particular RAT. For example, transmission may occur when terminal 103 is being authenticating to, for instance, iRAN 101a. If the access information relating to terminal 103 has not been previously provided to iRAN 101a, then iRAN 101a may request the access information from terminal 103 in an "on-demand" fashion. It is noted that the access information may be alternatively (or additionally) provided to iRAN 101a in a continuous or periodic fashion. As such, the access information is provided to RAN selector 111 for engaging in inter-technology load-balancing among those RATs that device 103 is capable of supporting and, thereby, those RANs (e.g., RANs 101a-101n) accessible to device 103, as well as supporting the specified RATs. In certain embodiments, the access information may be stored to any suitable repository of system 100, such as user profiles repository 317, a memory (not shown) of RAN selector 111, a memory (not shown) of device 103, etc.

In step 403, terminal 103 transmits application service information (e.g., a request for a particular application service) to iRAN 101a, which may be, in turn, provided to RAN selector 111. Based on the application service information (e.g., the request), RAN selector 111 may determine an application service being requested. Additionally (or alternatively), the application service information may be transmitted to service provider network 109 for determination of the application service being requested. Depending on the particular application service being requested, RAN list building module 309 generates a list of candidate RANs from, at least, those RANs capable of supporting the requested application service, per step 405; however, can be based on additional factors, as will become more apparent below. Namely, step 405 is described in more detail in conjunction with FIGS. 5A-5C.

According to exemplary embodiments, RAN list building module 309 outputs a list of candidate RANs that may be ported to RAN selection module 313 for determination of a target RAN, from those candidate RANs, to support communications associated with the requested application service, per step 407. In exemplary embodiments, selection of a target RAN may be based on one or more selection criteria or conditions, such as application service initialization times, handoff interruption times, network traffic measurements, signaling conditions, QoS parameters, service policy information, service provider preferences, threshold values, and/or the like. Selection of a target RAN is more fully explained in accordance with FIG. 6. Accordingly, a selected target RAN may be provided to handover module 305 to initiate (or otherwise perform) a handover to the selected target RAN, as in step 409. As previously mentioned, handovers are more fully explained in conjunction with FIG. 7.

Figure 5A:
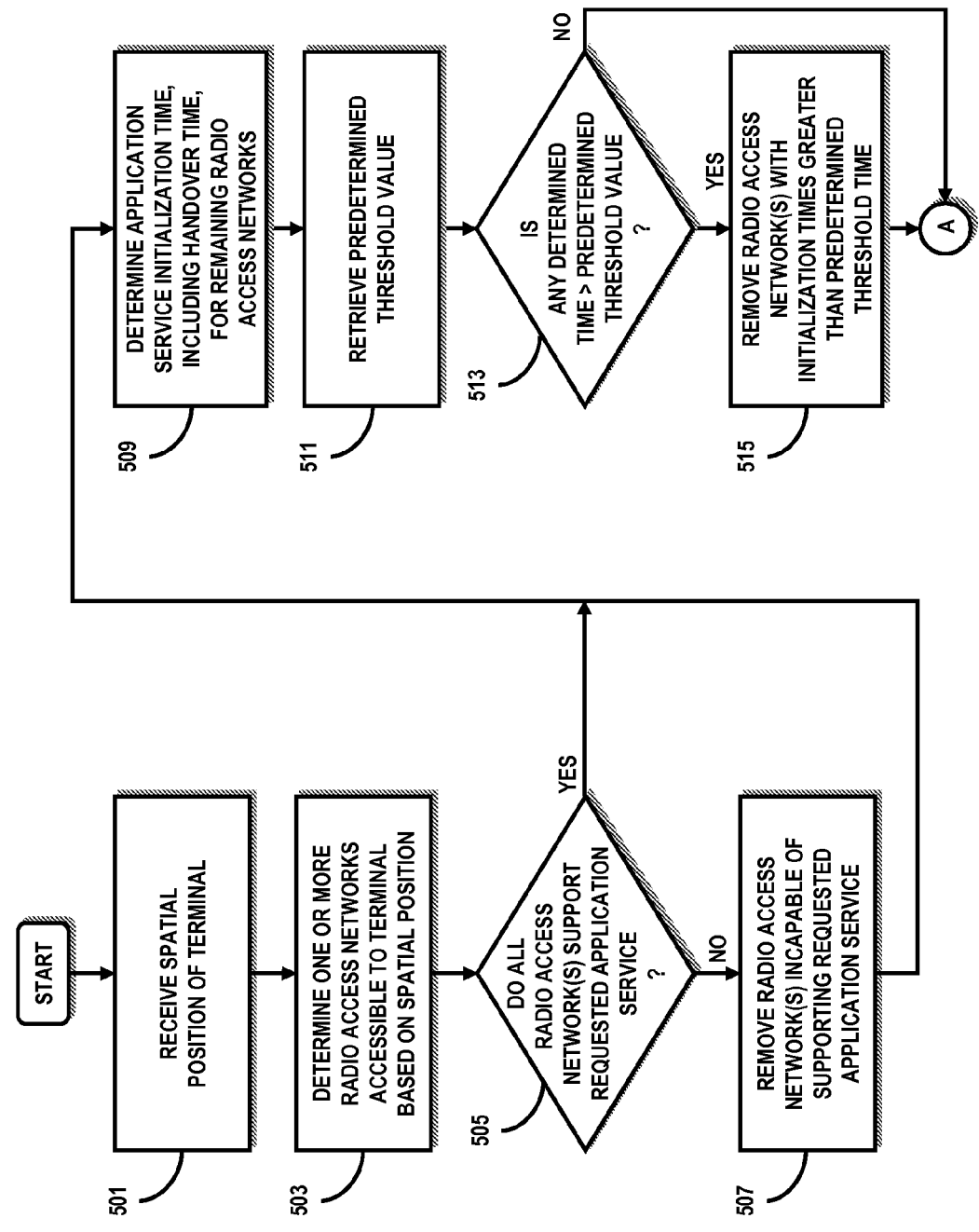
FIGS. 5A-5C are flowcharts of a process for generating a candidate list of radio access networks, according to an exemplary embodiment.
Figure 5B:
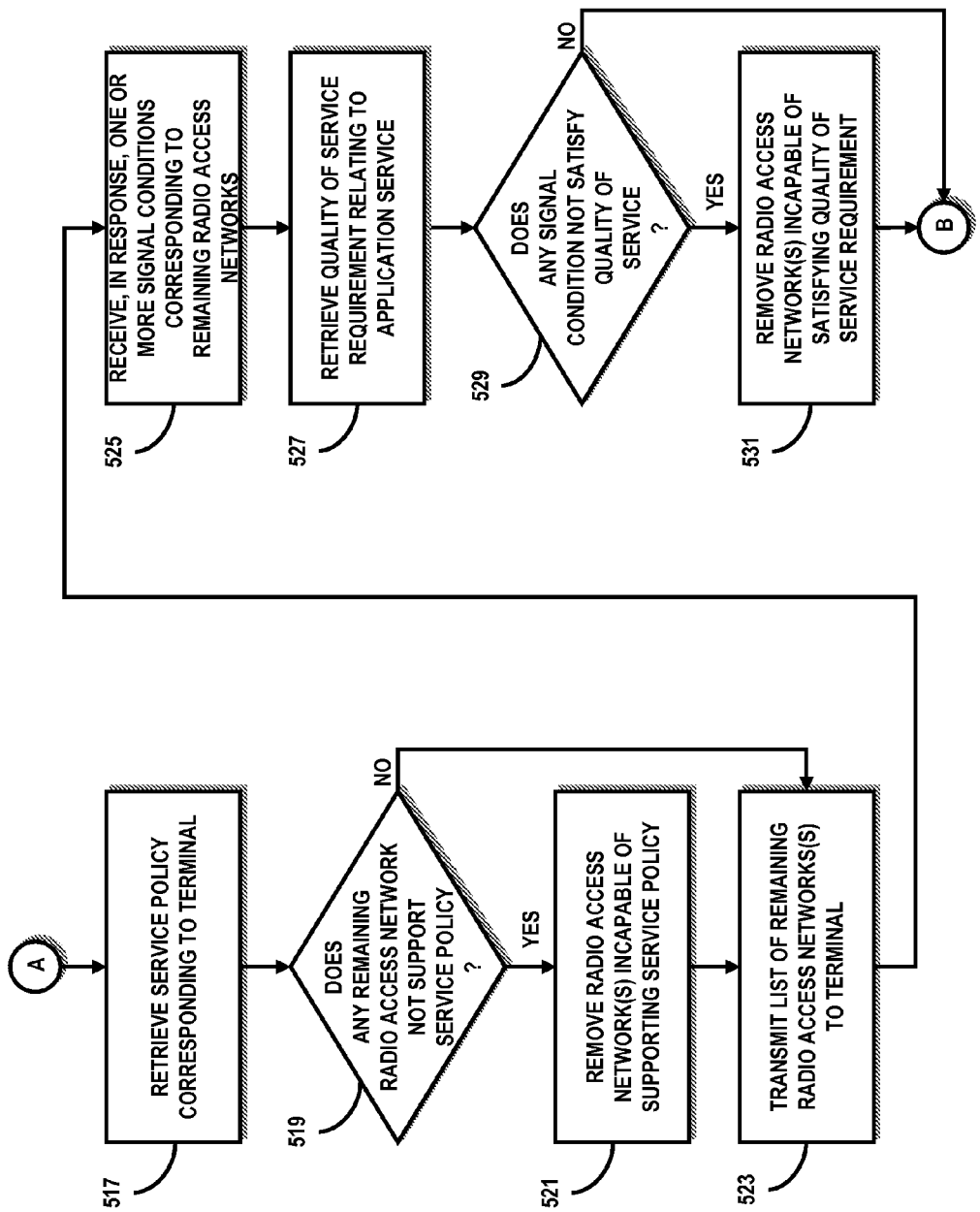
Figure 5C:
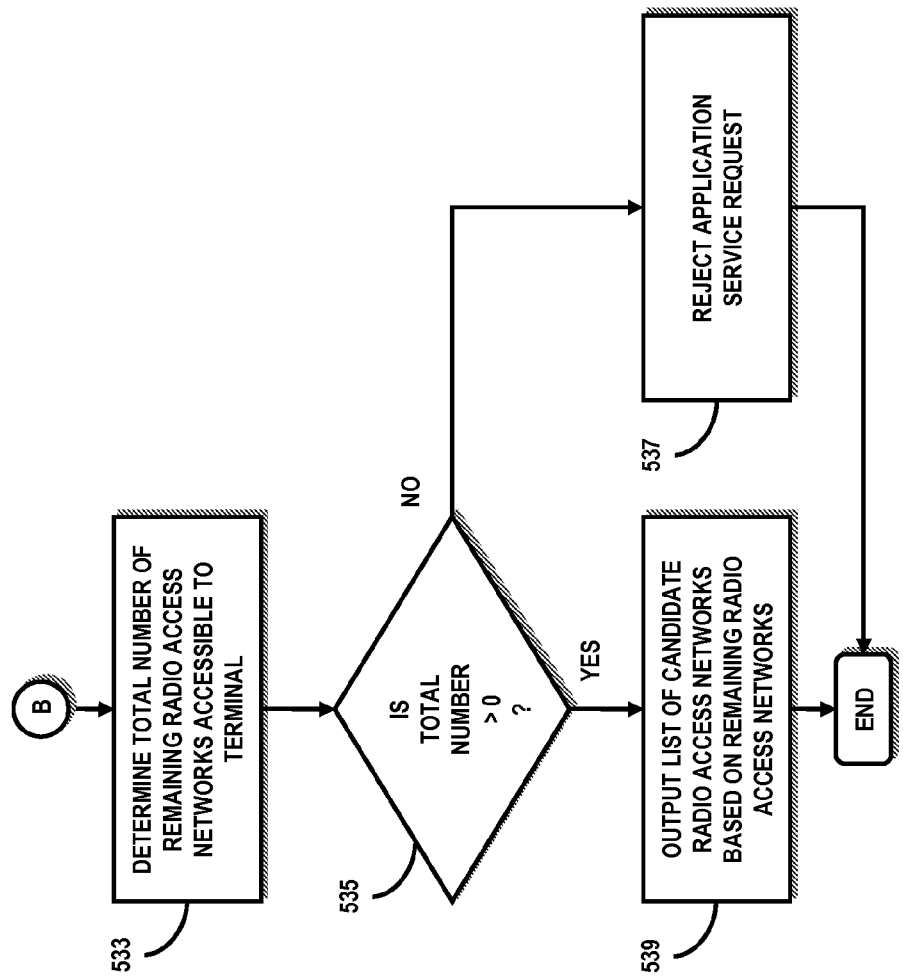

FIGS. 5A-5C are flowcharts of a process for generating a candidate list of radio access networks, according to an exemplary embodiment. For the purposes of illustration, the process is described with respect to FIGS. 1 and 3. It is further noted that while the process is explained with reference to RAN selector 111, it is also contemplated that RAN selector 105 may implement the process. Moreover, it is assumed that RAN list building module 309 is already privy to the RAT capabilities of terminal 103, as well as the application service requested by terminal 103.

At step 501, RAN list building module 309 receives a spatial position of terminal 103 via terminal 103 or via presence service module 307. Based on the spatial position, RAN list building module 309 and/or presence service module 307 determines, per step 503, one or more RANs accessible to terminal 103. As previously mentioned, RAN list building module 309 and/or presence service module 307 may correlate the spatial position of terminal 103 to predefined coverage areas stored to, for example, load information repository 315 in order to determine those RANs accessible to terminal 103. That is, by determining a distance from the spatial position to an epicenter of the coverage area, RAN list building module 309 and/or presence service module 307 can determine whether or not terminal 103 can access a particular RAN of system 100. It is contemplated, however, that coverage areas may alternatively defined (i.e., may be defined by configurations other than circular regions). As such, any other suitable method for determining whether terminal 103 is within a coverage area may be utilized, such as by other geometric techniques, comparing spatial coordinates, pinging requests, etc.

Once those RANs accessible to terminal 103 are determined, RAN list building module 309 may determine, in step 505, whether all of those RANs support the requested application service requested by a user of terminal 103. Accordingly, per step 507, those RANs incapable of supporting the requested application service may be removed from a potential list of candidate RANs. Based on those RANs remaining as part of the potential list of candidate RANs, RAN list building module 309 may determine, at step 509, corresponding application service initialization times for each remaining candidate RAN. It is noted that these application service initialization times may account for handover interruption times between an iRAN and a corresponding remaining RAN. In step 511, RAN list building module 309 via, for instance, communication interface 301, retrieves one or more predetermined threshold values (e.g., threshold initialization times) from, for example, load information repository 315, user profiles repository 317, or any other suitable repository of system 100. Accordingly, per step 513, RAN list building module 309 may determine if any determined application service initialization time satisfies a corresponding predetermined threshold value. For example, whether any application service initialization time is greater than a corresponding predetermined threshold value. In this manner, RAN list building module 309 may remove from a potential list of candidate RANs, at step 515, any RAN exhibiting an application service initialization time that satisfies a corresponding threshold for the particular RAN and/or requested application service, e.g., whether the application service initialization time is greater than the predetermined threshold.

Accordingly, at step 517, RAN list building module 309 via, for instance, communication interface 301, retrieves a service policy corresponding to terminal 103 and/or the requested application service. Based on those RANs remaining in the potential list of candidate RANs, RAN list building module 309 determines, per step 519, whether any remaining RAN is incapable of supporting one or more parameters of the service policy. Accordingly, in step 521, RAN list building module 309 removes any RAN that is incapable of supporting one or more parameters specified in the service policy from the potential list of candidate RANs. At step 523, RAN list building module 309 via, for example, communication interface 301, transmits a list of the remaining RANs to terminal 103. As such, in step 525, RAN list building module via, for instance, communication interface 301, receives one or more signal conditions (e.g., radio frequency strengths, noise, etc.) corresponding to each remaining RAN. Per step 527, RAN list building module 309 retrieves (or receives) one or more QoS requirements (e.g., threshold signal strength, threshold noise, etc.) relating to the requested application service via communication interface 301, for example. These QoS requirements may be retrieved from any suitable repository of system 100, such as load information repository 315, user profiles repository 317, etc. Based on the signal condition(s) and the QoS requirement(s), RAN list building module 309 may determine, in step 529, whether any particular signal condition and, thereby, corresponding RAN, not satisfy one or more of the QoS requirements. Accordingly, RAN list building module 309 may remove, from a potential list of candidate RANs, any RAN incapable of satisfying one or more of the QoS requirements, per step 531.

Based on those RANs remaining, RAN list building module 309 may determine, at step 533, a total number of candidate RANs accessible to terminal 103 that also satisfy the each of the aforementioned conditions. Per step 535, RAN list building module 309 determines whether the total number of candidate RANs is greater than zero. If the total number of candidate RANs is equal to zero, i.e., no candidate RANs remain, RAN selector 300 can reject the application service request of terminal 103, in step 537. If the total number of candidate RANSs is greater than zero, i.e., at least one candidate RAN remains, RAN list building module 309 may output a list of candidate RANs based on those remaining RANs, per step 539.

According to exemplary embodiments, the list of candidate RANs may be ported to RAN selection module 313 of RAN selector 111 or transmitted to RAN selection module 313 of RAN selector 105, in order to determine a target RAN.

Figure 6:
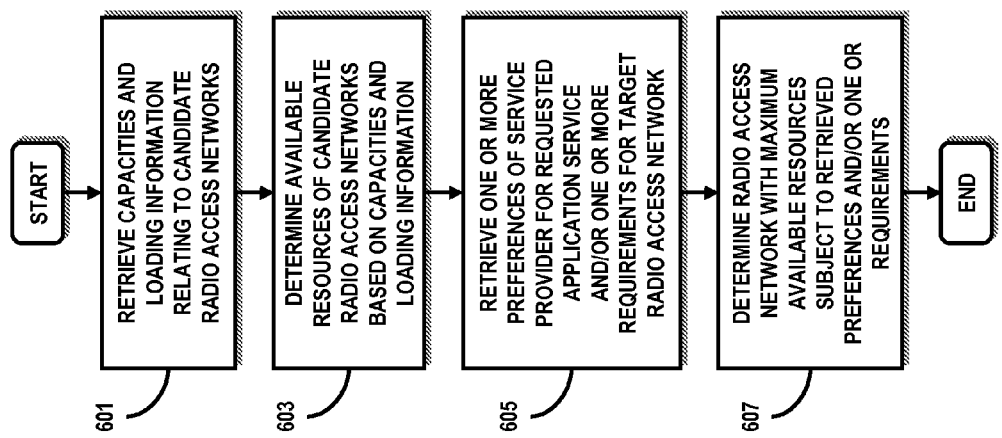
FIG. 6 is a flowchart of a process for determining a target radio access network, according to an exemplary embodiment.

FIG. 6 is a flowchart of a process for determining a target radio access network, according to an exemplary embodiment. For the purposes of illustration, the process is described with respect to FIGS. 1 and 3. It is further noted that while the process is explained with reference to RAN selector 111, it is also contemplated that RAN selector 105 may implement the process. At step 601, RAN selection module 313 via, for example, communication interface 301, retrieves or otherwise determines capacities (e.g., possible bandwidth capabilities) and loading information of candidate RANs specified by RAN list building module 309, such as those RANs output by RAN list building module 309 as a result of the process of FIGS. 6A-6B. In exemplary embodiments, the capacities may be retrieved from load information repository 315 and may be defined in relation to particular RATs corresponding to particular RANs, e.g., defined in terms of a maximum rise over thermal (RoT) value for a particular RAN, a total number of possible carriers for a particular RAN, a total number of possible time slots for a particular RAN, a total number of possible time-frequency blocks for a particular RAN, etc. Similarly, loading information may be retrieved from load information repository 315 or may be determined "on-the-fly" by RAN monitoring module 311 through the exchange of suitable communications between an iRAN and cRAN$_i$ or via suitable OTA measurements. Like the capacity values, loading information may be defined in relation to particular RATs corresponding to particular RANs, e.g., defined in terms of a maximum rise over thermal (RoT) value for a particular RAN, a total number of possible carriers for a particular RAN, a total number of possible time slots for a particular RAN, a total number of possible time-frequency blocks for a particular RAN, etc. Based on these capacities and loading information, RAN selection module 313, per step 603, determines available resources of the candidate RANs, which may be executed by RAN selection module 313 via one or more of Equations (1)-(13).

In step 605, RAN selection module 313 via, for example, communication interface 301, retrieves (or receives) one or more preferences (e.g., one or more weighting elements $\omega_{AS}^{(i)}$) of a service provider of system 100 relating to a requested application service and/or one or more requirements (e.g., load, capacity, resource requirement, predetermined constant, etc.) for a target radio access network. These preferences and/or requirements may be retrieved from any suitable storage location of system 100, such as user profiles repository 117, loading information repository 115, etc. Utilizing one or more of Equations (14)-(41), RAN selection module 313 may determine a target radio access network as the particular candidate radio access network exhibiting a maximum amount of available resources subject to the retrieved preferences and/or the one or more requirements, per step 607. As previously mentioned, RAN selection module 313, in exemplary embodiments, may based this determination on available resources "before," "after," or "before and after" the addition of network traffic associated with communications between terminal 103 and a requested application service.

Figure 7:
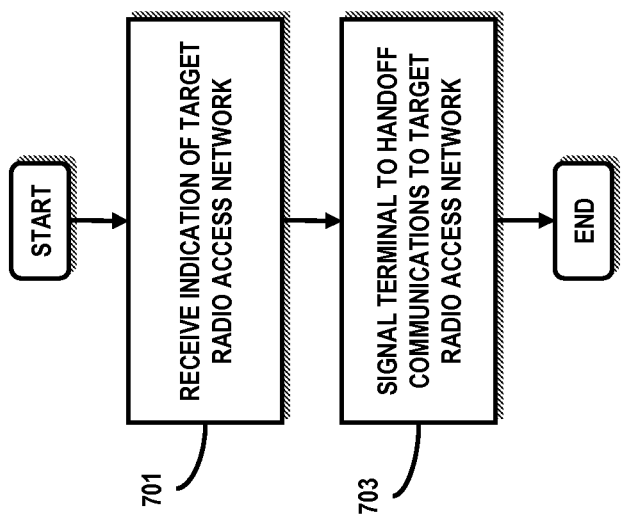
FIG. 7 is a flowchart of a process for handing over a communication session from an interworking radio access network to a target radio access network, according to an exemplary embodiment.

FIG. 7 is a flowchart of a process for handing over a communication session from an interworking radio access network to a target radio access network, according to an exemplary embodiment. For the purposes of illustration, the process is described with respect to FIGS. 1 and 3. It is further noted that while the process is explained with reference to RAN selector 111, it is also contemplated that RAN selector 105 or the combination of RAN selectors 105 and 111 may implement the process. In step 701, handover module 305 receives an indication of a target radio access network (e.g., RAN 101b) specified by, for example, RAN selection module 313. Based on the specified target radio access network, handover module 305 signals (or otherwise commands) terminal 103 to handoff communications from an iRAN (e.g., RAN 101a) to the specified target radio access network (e.g., RAN 101b), per step 703. This enables the specified target RAN and, thereby, the RAT of the target RAN, to provide a requested application service to terminal 103. Furthermore, by handing communications over to the specified target RAN, the load on RANs 101a-101n may be balanced or otherwise optimized.

Figure 8:
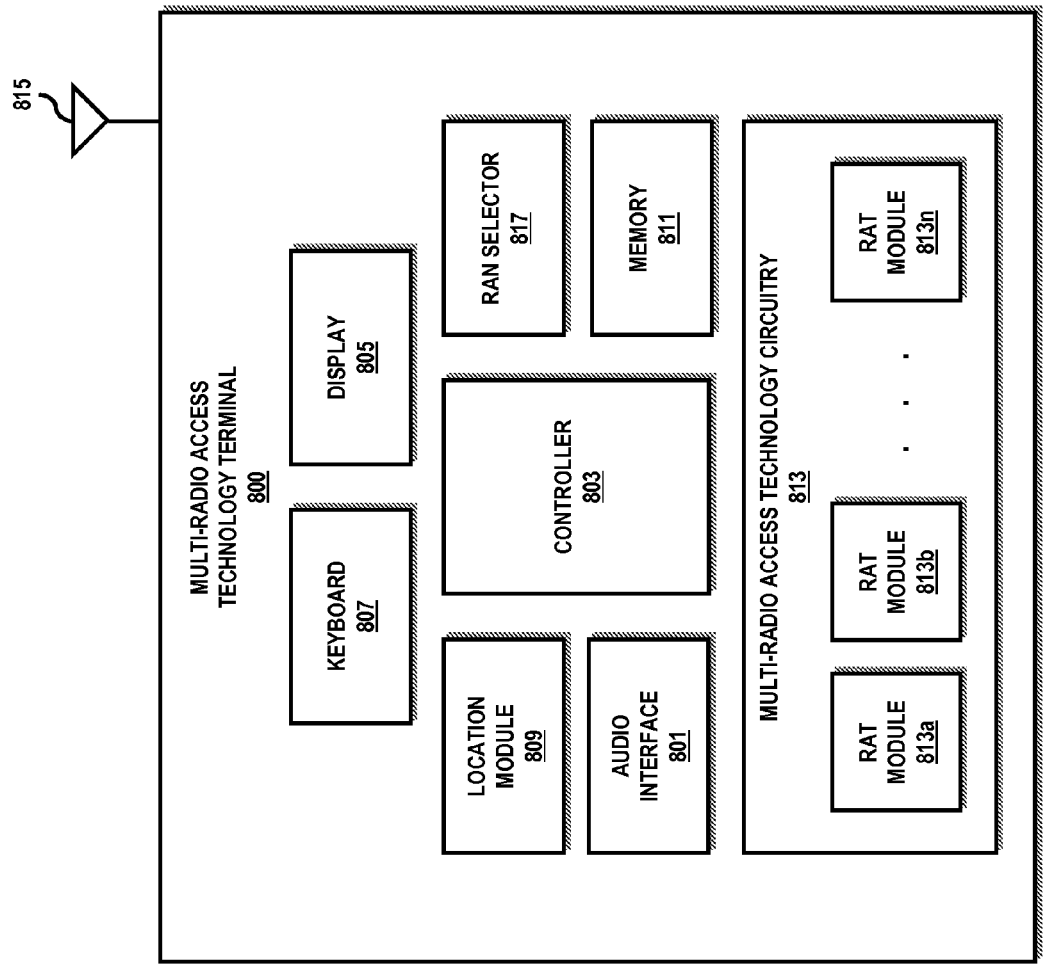
FIG. 8 is a diagram of a multi-radio access technology terminal, according to an exemplary embodiment.

FIG. 8 is a diagram of a multi-radio access technology terminal, according to an exemplary embodiment. Multi-RAT terminal (or terminal) 800 may comprise computing hardware (such as described with respect to FIG. 9), as well as include one or more components configured to execute the processes described herein for providing inter-technology load-balancing for multi-RAT networks. In this example, terminal 800 includes audio interface 801, controller (or processor) 803, display 805, keyboard 807, location module 809, memory 811, multi-RAT circuitry 813 coupled to one or more antennas 815, and RAN selector 817. While specific reference will be made thereto, it is also contemplated that multi-RAT terminal 800 may embody many forms and include multiple and/or alternative components.

According to various embodiments, multi-RAT terminal 800 is configured to transmit real-time positional information corresponding to its location to an iRAN, such as RAN 101a, and, more specifically, to RAN selector 111, for determining one or more RANs accessible by terminal 800. In other embodiments, real-time positioning information may be ported to RAN selector 817 for this purpose. Additionally (or alternatively), location module 809 may be configured to determine those RANs accessible by terminal 800 based on one or more coverage areas stored to, for example, memory 811 or any other suitable storage location of system 100, such as load information repository 115. Accordingly, location module 809 may transmit or port those RANs accessible by terminal 800 to RAN selector 111 and/or RAN selector 817. In return, RAN selector 111 or 817 may provide terminal 800 with a list of candidate RANs capable of supporting a requested application service (requested by a user of terminal 800) or a particular target RAN (or information corresponding thereto) to handoff communications from an iRAN to the particular target RAN to support the requested application service. If a list of candidate RANs are provided, terminal 800, via RAN selector 817 and, more specifically, via RAN monitoring module 311, may determine (or otherwise) measure signal conditions of the candidate RANs specified in the list. These measurements (or one or more reports containing information corresponding to these measurements) may be transmitted to RAN selector 111 and/or ported to RAN selector 817. In return, RAN selector 111 and/or RAN selector 817 may determine a target RAN for handover module 305 of RAN selector 111 and/or RAN selector 817 to handoff communications from an iRAN to the target RAN. It is noted that the determination of the target RAN may be based on various information (e.g., requested application service, loading information, QoS parameter values, service policies, service provider preferences, threshold values, etc.) store to, for example, memory 811, user profiles repository 117, load information repository 117, or any other suitable storage location of system 100. As such, it is contemplated that multi-RAT terminal 800 may, in certain embodiments, assume one or more of the aforementioned responsibilities of RAN selector 111 via RAN selector 817 or RAN selectors 111 and 817 may function in concert with one another.

Multi-RAT terminal 800 may also include one or more client programs (or instructions) that operate thereon to access and/or execute one or more application services; however, it is contemplated that these client programs may be executed via another facility of system 100 and, thereby, made accessible to users via multi-RAT terminal 800, such as via one or more online (or otherwise networked) applications provided by, for instance, application services 113a-113n.

These client programs may relate to one or more GUIs configured to execute any host of application services, such as voice, messaging, navigation, electronic mail, Internet browsing, data manipulation, multimedia playback, image capturing, etc. In exemplary embodiments, network browser applications may be provided for accessing applications made available by, for example, one or more of application services 113a-113n. Users may interface with these client programs via audio interface 801, display 805, keyboard 807, and/or any other suitable input mechanism, e.g., buttons, joysticks, soft controls, touch panels, widget applications, etc. Audio interface 801 may include one or more components and corresponding functionality for effectuating a voice interface, e.g., speech synthesis technology and voice recognition capabilities. In this manner, multi-RAT circuitry 813 may be configured to communicate requested application services to an iRAN and/or RAN selector 111 for determination of a target RAN. Additionally (or alternatively), requested application services may be ported to RAN selector 817 for this purpose.

In exemplary embodiments, one or more client programs, commands, instructions, etc., may be stored to memory 811, which may include volatile and/or non-volatile memory, such as erasable programmable read-only memory (EPROM), electrically erasable programmable read-only memory (EEPROM), flash memory, random access memory (RAM), read only memory (ROM), etc. Memory 811 may be implemented as one or more discrete devices, stacked devices, or integrated with controller 803. In addition, communication signals, such as voice calls, short messages, multimedia messages, and control signals, received by multi-RAT terminal 800 may also be stored to memory 811, as well as coverage areas, loading information, QoS parameters, service policies, service provider preferences, threshold parameter values, etc., for executing the processes described herein.

As previously mentioned real-time positional information may be obtained or determined via location module 809. In certain embodiments location module 809 may determine such positional information using, for example, GPS technology. In this way, location module 809 can behave as a GPS receiver. Thus, terminal 800 may employ location module 809 to communicate with a constellation of satellites (not illustrated). These satellites transmit very low power interference and jamming resistant signals that can be received by GPS receiver 809. At any point on Earth, GPS receiver 809 can receive signals from multiple satellites (e.g., 6 to 11). Specifically, GPS receiver 809 may determine three-dimensional geolocation (or spatial positional information) from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by the GPS satellites. Therefore, if multi-RAT terminal 800 can identify the signals from at least four satellites, receiver 809 may decode the ephemeris and clock data, determine the pseudo range for each satellite and, thereby, compute the spatial position of a GPS receiving antenna (not shown). With GPS technology, terminal 800 can determine its spatial position with great accuracy and convenience. In other instance, this GPS information may be utilized by terminal 800 to determine one or more RANs accessible by terminal 800 based on, for example, coverage areas stored to memory 811 or any other suitable storage location of system 100, such as loading information repository 115.

Additionally, multi-RAT terminal 800 may employ A-GPS to mitigate the loss of GPS signals from obstructions between the GPS receiver 809 and the satellites. When operating in A-GPS mode, terminal 800 can provide for better in building or obstructed view spatial positional information. Assistance data can be transmitted to terminal 800 from, for example, one or more of RANs 101a-101n. In an exemplary embodiment, A-GPS information may include ephemeris data, differential GPS correction data, timing data, and other aiding data. Using the aiding (or assistance) data, location module 809 performs spatial positioning calculations via, for example, controller (or processor) 803. Additionally, transmission of the spatial positional information need not be frequent. Further, transmission of the geolocation data can be made more compact because it is true location rather than pseudo range data. Also, terminal 800 can more intelligently request assistance data because the device can itself determine when ephemeris data is no longer valid. It is also contemplated that other suitable navigation and location determination technologies may be utilized, such as advanced forward link trilateration (A-FLT), enhanced cellular identification (CELL-ID), wireless local area network (WLAN) positioning, etc. In any case, determined spatial positional information may be transmitted to RAN selector 111 via multi-RAT circuitry 813 or ported to RAN selector 817 to execute one or more of the processes described herein.

Multi-RAT circuitry 813 enables multi-RAT terminal 800 to communicate (i.e., transmit and/or receive information from another networking node) via one or more of RANs 101a-101n. In this manner, multi-RAT circuitry may include one or more software and/or hardware RAT modules (e.g., RAT modules 813a, 813b, . . . , 813n) for transmitting and receiving information via RANs 101a-101n using one or more RATs. For example, multi-RAT circuitry 8163 via one or more of RAT modules 813a-813n may provide for any one or more of the aforementioned RATs of RANs 101a-101n, such as AMPS, CDPD, CSD, CDMA2000, D-AMPS, EDGE, E-UMTS, GPRS, GSM, HRPD, IS-95, IMS, 3GPP LTE, 3GPP2 UMB, UMTS, BLUETOOTH™, (WIFI™), (WIMAX™), IEEE 802.22, UWB, etc. Accordingly, multi-RAT circuitry 813 may also be utilized to communicate with a wireless headset (not shown) via one or more RATs. For instance, the headset may be BLUETOOTH™ enabled. It is contemplated that other equivalent RATs and protocols may be utilized.

Received information, such as spatial positioning information, coverage areas, QoS parameter values, service policies, service provider preferences, threshold values, loading information, incoming communication sessions, one or more pages of GUI content, etc., may be presented to users via display 805. Mobile device 800 is also configured to store and execute instructions for supporting the inter-technology load-balancing function for multi-RAT networks of system 100, as well as other communication functions made available via multi-RAT circuitry 813. In this manner, controller 803 controls the operation of multi-RAT terminal 800 according to programs and/or data stored to memory 811.

Control functions may be implemented in a single controller (or processor) 803 or via multiple controllers (or processors) 803. Suitable controllers 803 may include, for example, both general purpose and special purpose controllers, as well as digital signal processors, local oscillators, microprocessors, etc. Controller 803 may also be implemented as a field programmable gate array controller, reduced instruction set computer processor, etc. Controller 803 may interface with audio interface 801 that provides analog output signals to one or more speakers (not shown) and receives analog audio inputs from one or more microphones (not illustrated).

According to some embodiments, multi-RAT terminal 800 includes RAN selector 817 (or one or more components of RAN selector 300) for assuming one or more of the aforementioned functions described with respect to RAN selector 300. In this way, RAN selector 817 may include one or more modules (not shown) corresponding to modules 301-313 of RAN selector 300. It is noted, however, that real-time positioning information can be acquired via location module 809, instead of (or in addition to) presence service module 307.

The processes described herein for inter-technology load-balancing between multi-radio access technology networks may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
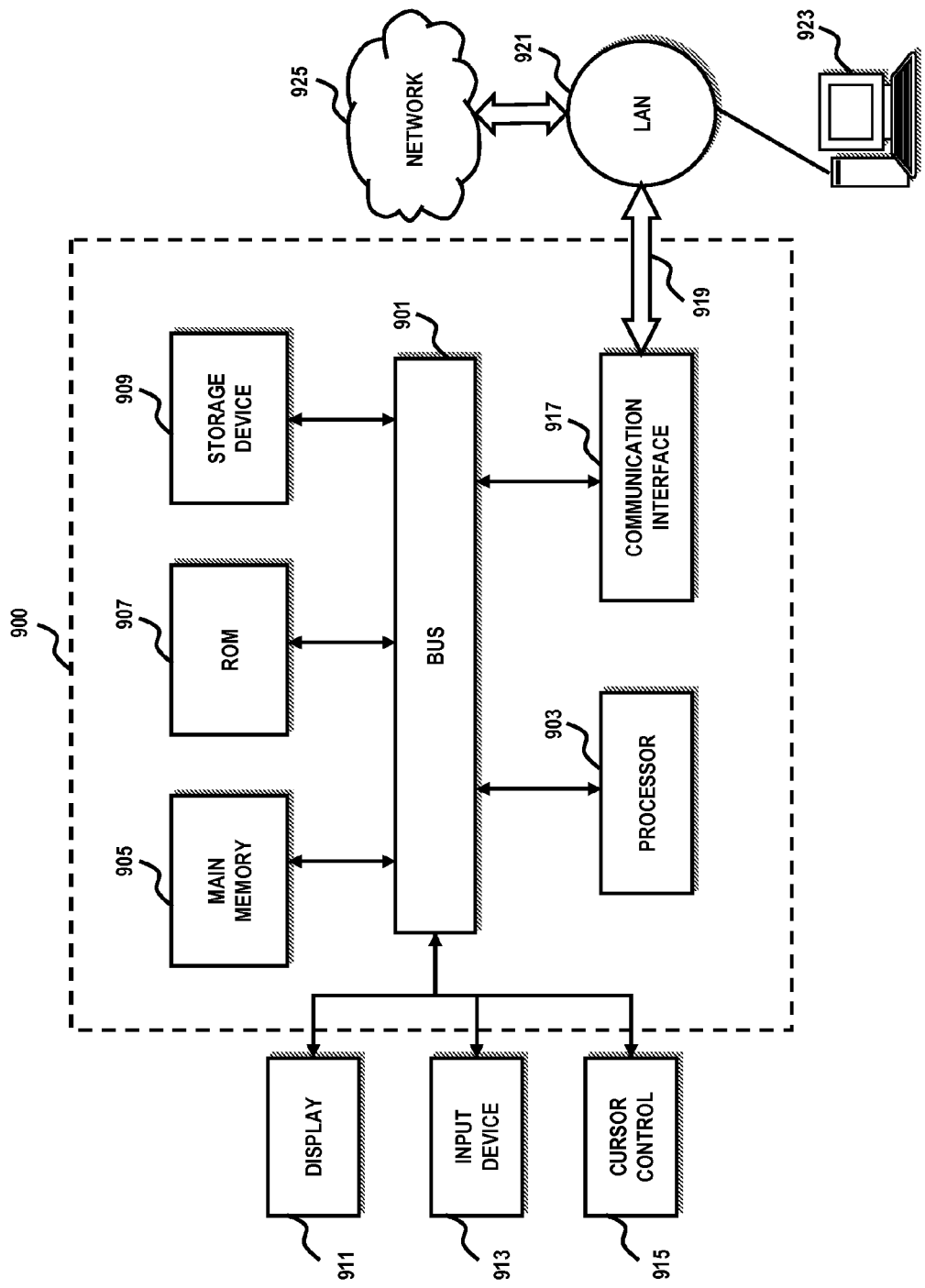
FIG. 9 is a diagram of a computer system that can be used to implement various exemplary embodiments.

FIG. 9 illustrates computing hardware (e.g., computer system) 900 upon which an embodiment according to the invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A mobile device comprising:
a first communication circuitry configured to communicate with a first radio access network that utilizes a first radio access technology;
a second communication circuitry configured to communicate with a second radio access network that utilizes a second radio access technology different from the first radio access technology; and
selection logic configured to determine loading information of the first radio access network and the second radio access network, and to select one of the radio access networks based on the loading information;
wherein a list of candidates from the radio access networks is output based on the loading information, and the selection logic is further configured to:
determine whether one of the candidates supports a requested application service; and
remove the one candidate from the list if the one candidate is incapable of supporting the requested application service.

2. The mobile device of claim 1, wherein the first communication circuitry is further configured to receive loading information from the first radio access network, and the second communication circuitry is further configured to receive loading information from the second radio access network.

3. The mobile device of claim 1, wherein the selection performed by the selection logic is further based on at least one of whether support is provided for a requested application service, whether handover interruption time satisfies a predetermined threshold value, a service policy, a quality of service (QoS) requirement, a channel condition corresponding to the radio access networks, or a combination thereof.

4. The mobile device of claim 1, wherein the loading information corresponds to a universal loading indicator, the universal loading indicator including a plurality of loading coefficients, each loading coefficient defining a ratio between real-time usage of network resources corresponding to a particular radio access network and capacity of the particular radio access network.

5. The mobile device of claim 1, wherein the selection logic is further configured to:
determine a handover interruption time for one of the candidates;
compare the determined handover interruption time with a predetermined threshold value; and
remove the one candidate from the list if the determined handover interruption time satisfies the predetermined threshold value.

6. A method comprising:
communicating with a first radio access network that utilizes a first radio access technology;
communicating with a second radio access network that utilizes a second radio access technology different from the first radio access technology;
determining loading information of the first radio access network and the second radio access network;
selecting one of the radio access networks based on the loading information; and
outputting a list of candidates from the radio access networks based on the loading information;
wherein the selecting further comprises:
determining whether one of the candidates supports a requested application service; and
removing the one candidate from the list if the one candidate is incapable of supporting the requested application service.

7. The method of claim 6, further comprising:
receiving loading information from the first radio access network, and
receiving loading information from the second radio access network.

8. The method of claim 6, wherein selecting one of the radio access networks is further based on at least one of whether support is provided for a requested application service, whether handover interruption time satisfies a predetermined threshold value, a service policy, a quality of service (QoS) requirement, a channel condition corresponding to the radio access networks, or a combination thereof.

9. The method of claim 6, wherein the determined loading information corresponds to a universal loading indicator, the universal loading indicator including a plurality of loading coefficients, each loading coefficient defining a ratio between real-time usage of network resources corresponding to a particular radio access network and capacity of the particular radio access network.

10. The method of claim 6, further comprising:
determining a handover interruption time for one of the candidates;
comparing the determined handover interruption time with a predetermined threshold value; and
removing the one candidate from the list if the determined handover interruption time satisfies the predetermined threshold value.

11. An apparatus comprising:
a processor configured to initiate communication with a first radio access network that utilizes a first radio access technology, and to initiate communication with a second radio access network that utilizes a second radio access technology different from the first radio access technology,
wherein the processor is further configured to determine loading information of the first radio access network and the second radio access network, and to select one of the radio access networks based on the loading information;

wherein a list of candidates from the radio access networks is output based on the loading information, and the processor is further configured to:

determine whether one of the candidates supports a requested application service; and remove the one candidate from the list if the one candidate is incapable of supporting the requested application service or if handover interruption time fails to satisfy a predetermined threshold.

12. The apparatus of claim 11, further comprising:

a memory configured to receive loading information from the first radio access network, and loading information from the second radio access network.

13. The apparatus of claim 11, wherein the selection includes one of the radio access networks and is further based on at least one of whether handover interruption time satisfies a service policy, a quality of service (QoS) requirement, a channel condition corresponding to the radio access networks, or a combination thereof.

14. The apparatus of claim 11, wherein the loading information corresponds to a universal loading indicator, the universal loading indicator including a plurality of loading coefficients, each loading coefficient defining a ratio between real-time usage of network resources corresponding to a particular radio access network and capacity of the particular radio access network.

15. The apparatus of claim 11, wherein the processor is further configured to:

determine a handover interruption time for one of the candidates;

compare the determined handover interruption time with a predetermined threshold value; and remove the one candidate from the list if the determined handover interruption time satisfies the predetermined threshold value.

\* \* \* \* \*